United States Patent
Burge

(10) Patent No.: US 11,774,236 B2
(45) Date of Patent: Oct. 3, 2023

(54) ALIGNMENT OF A MEASUREMENT OPTICAL SYSTEM AND A SAMPLE UNDER TEST

(71) Applicant: ARIZONA OPTICAL METROLOGY LLC, Tucson, AZ (US)

(72) Inventor: James Burge, Tucson, AZ (US)

(73) Assignee: ARIZONA OPTICAL METROLOGY LLC, Tucson, AZ (US)

( * ) Notice: Subject to any disclaimer, the term of this patent is extended or adjusted under 35 U.S.C. 154(b) by 0 days.

(21) Appl. No.: 17/923,777

(22) PCT Filed: Feb. 7, 2022

(86) PCT No.: PCT/US2022/015409
§ 371 (c)(1),
(2) Date: Nov. 7, 2022

(87) PCT Pub. No.: WO2022/170160
PCT Pub. Date: Aug. 11, 2022

(65) Prior Publication Data
US 2023/0123150 A1    Apr. 20, 2023

Related U.S. Application Data

(60) Provisional application No. 63/252,510, filed on Oct. 5, 2021, provisional application No. 63/146,685, filed on Feb. 7, 2021.

(51) Int. Cl.
*G01B 11/02*    (2006.01)
*G01B 11/24*    (2006.01)
(Continued)

(52) U.S. Cl.
CPC ............ *G01B 11/2441* (2013.01); *G02B 5/13* (2013.01); *G02B 7/1827* (2013.01)

(58) Field of Classification Search
CPC  G01B 11/2441; G01B 9/02039; G01B 9/021; G01B 9/02056; G01B 9/02058;
(Continued)

(56) References Cited

U.S. PATENT DOCUMENTS 6,469,791 B1 * 10/2002 Stenton .............. G01M 11/0271
356/458
6,515,750 B1 * 2/2003 Malyak ................ G01B 9/0209
356/512
(Continued)

FOREIGN PATENT DOCUMENTS

EP          3224570 B       1/2020

OTHER PUBLICATIONS

Thorlabs Hollow Retroreflector Mirrors (https://www.thorlabs.com/newgrouppage9.cfm?objectgroup_id=12625) (HRM) as dated by the wayback machine to Sep. 28, 2020 (Year: 2020).*

(Continued)

*Primary Examiner* — Uzma Alam
*Assistant Examiner* — Jonathon Cook
(74) *Attorney, Agent, or Firm* — Quarles & Brady LLP; Yakov S. Sidorin

(57) ABSTRACT

A metrology frame configured to receive and secure a workpiece in preparation for an interferometric determination of a spatial profile of the workpiece with the use of one or more retroreflectors removably cooperated with the frame in known pre-determined spatial relationship with respect the fiducial features of not only the workpiece but those of the metrology frame itself. The metrology frame is necessarily devoid of a holographic optical element, while the measurement apparatus containing such metrology frame employs a hologram configured to generate at least one alignment optical wavefront that spatially converges on the retroreflector. The hologram is preferably structured as a set (Continued)

of constituent holographic regions (contained in the same, unitary or spatially-complementary housing and/or substrate) that perform different but operationally-complementary functions to facilitate the alignment of the metrology frame with respect to the converging optical wavefront with or without the workpiece in the frame. The optical measurement system employing the metrology frame and the hologram. Methods of optical alignment with use of same.

30 Claims, 9 Drawing Sheets

(51) Int. Cl.
 *G02B 5/13* (2006.01)
 *G02B 7/182* (2021.01)
(58) Field of Classification Search
 CPC ........... G01B 9/02067; G01B 2290/15; G01M 11/005; G01M 11/025; G01M 11/0271
 See application file for complete search history.

(56) References Cited

U.S. PATENT DOCUMENTS

| | | | |
|---|---|---|---|
| 2006/0092430 A1* | 5/2006 | Lizotte | G01B 11/25 356/600 |
| 2008/0068613 A1 | 3/2008 | Kuchel | |
| 2010/0177321 A1* | 7/2010 | Hetzler | G01B 9/02039 356/512 |
| 2012/0145872 A1 | 6/2012 | Heidemann et al. | |
| 2012/0229814 A1* | 9/2012 | Freimann | G01M 11/025 359/708 |
| 2020/0064580 A1 | 2/2020 | Foes et al. | |
| 2020/0225029 A1* | 7/2020 | Riepenhausen | G01M 11/0271 |

OTHER PUBLICATIONS

Thorlabs Quick Connect Linear Stages, 50 mm Travel, Crossed-Roller Bearings (https://www.thorlabs.us/newgrouppage9.cfm?objectgroup_id=11538) (QCLS) as dated by the wayback machine to Oct. 31, 2020 (Year: 2020).*
Thorlabs Compact Quick Connect Rotation Stage with Crossed-Roller Bearings (https://www.thorlabs.us/newgrouppage9.cfm?objectgroup_id=12961) (QCRS)) as dated by the wayback machine to Oct. 21, 2020 (Year: 2020).*
Thorlabs ORIC 20 mm linear translation stage with Piezoelectric inertia drive (https://www.thorlabs.com/newgrouppage9.cfm?objectgroup_id=12991 As dated by the wayback machine Sep. 2020) (Year: 2020).*
Shah Karim, Real-time target alignment system for high-power laser operations using a hybrid mechanism, Thesis submitted to the University of Nottingham for the degree of Doctor of Philosophy, Feb. 2020 (Year: 2020).*

* cited by examiner

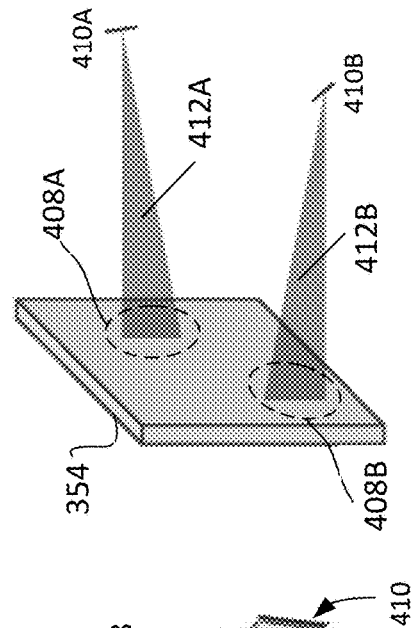
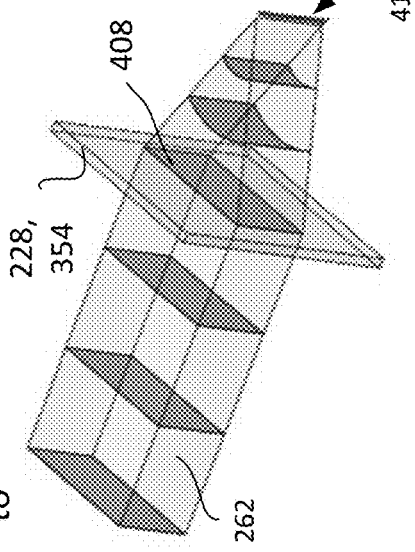
FIG. 4A
FIG. 4B
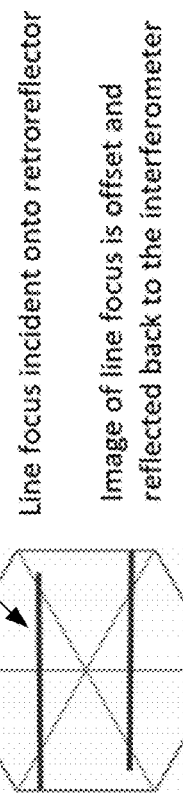
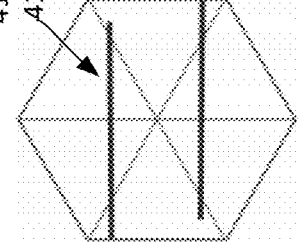
FIG. 5B
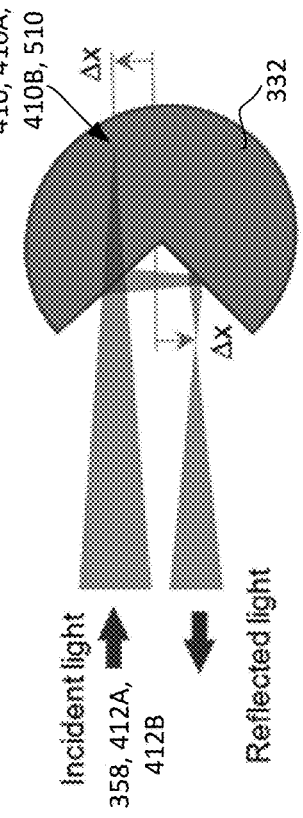
FIG. 5A

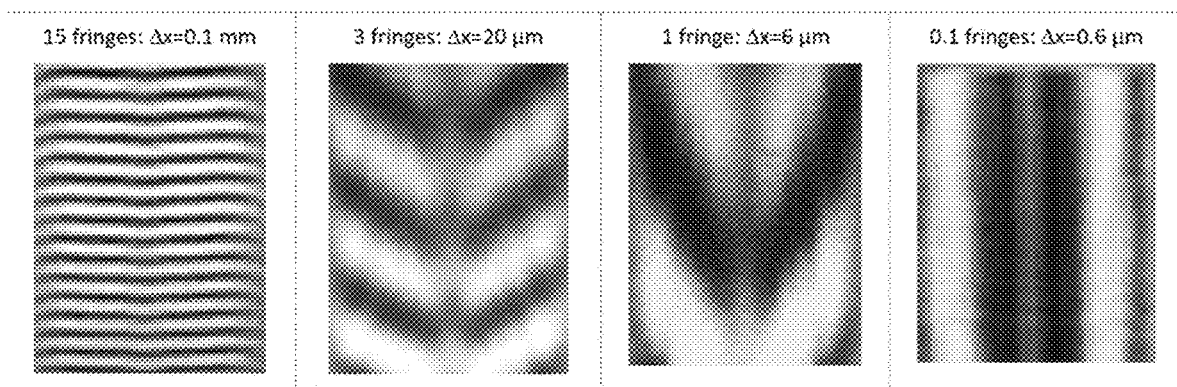
FIG. 6A  FIG. 6B  FIG. 6C  FIG. 6D
FIG. 7
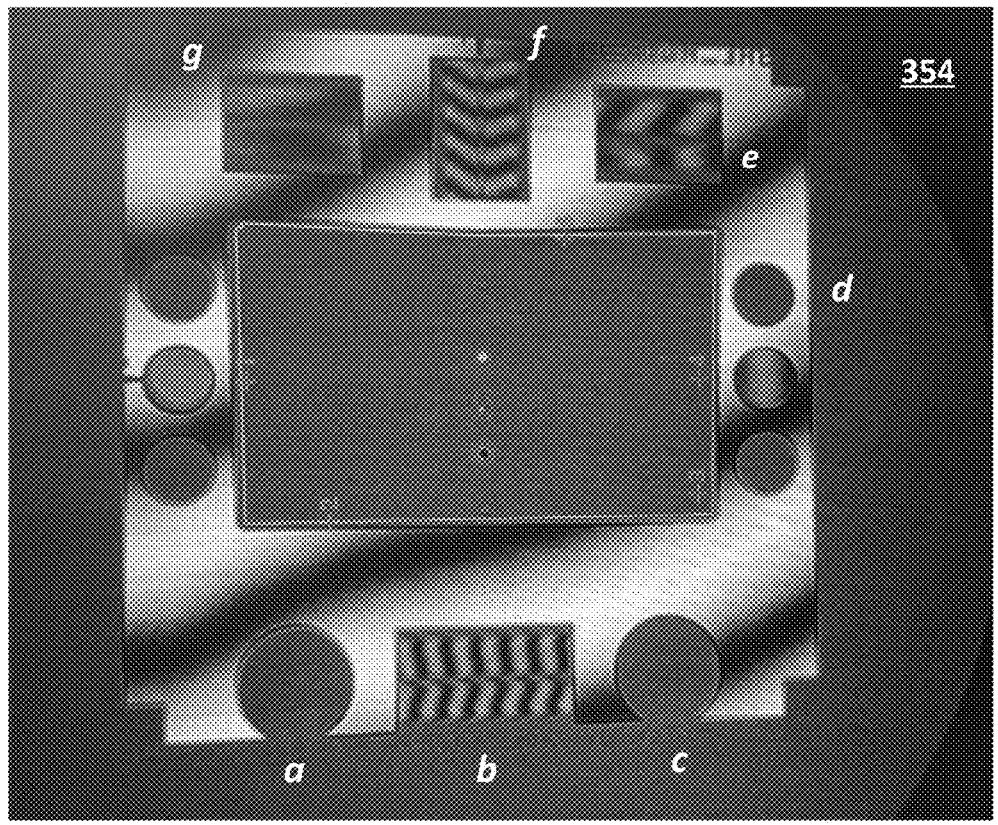

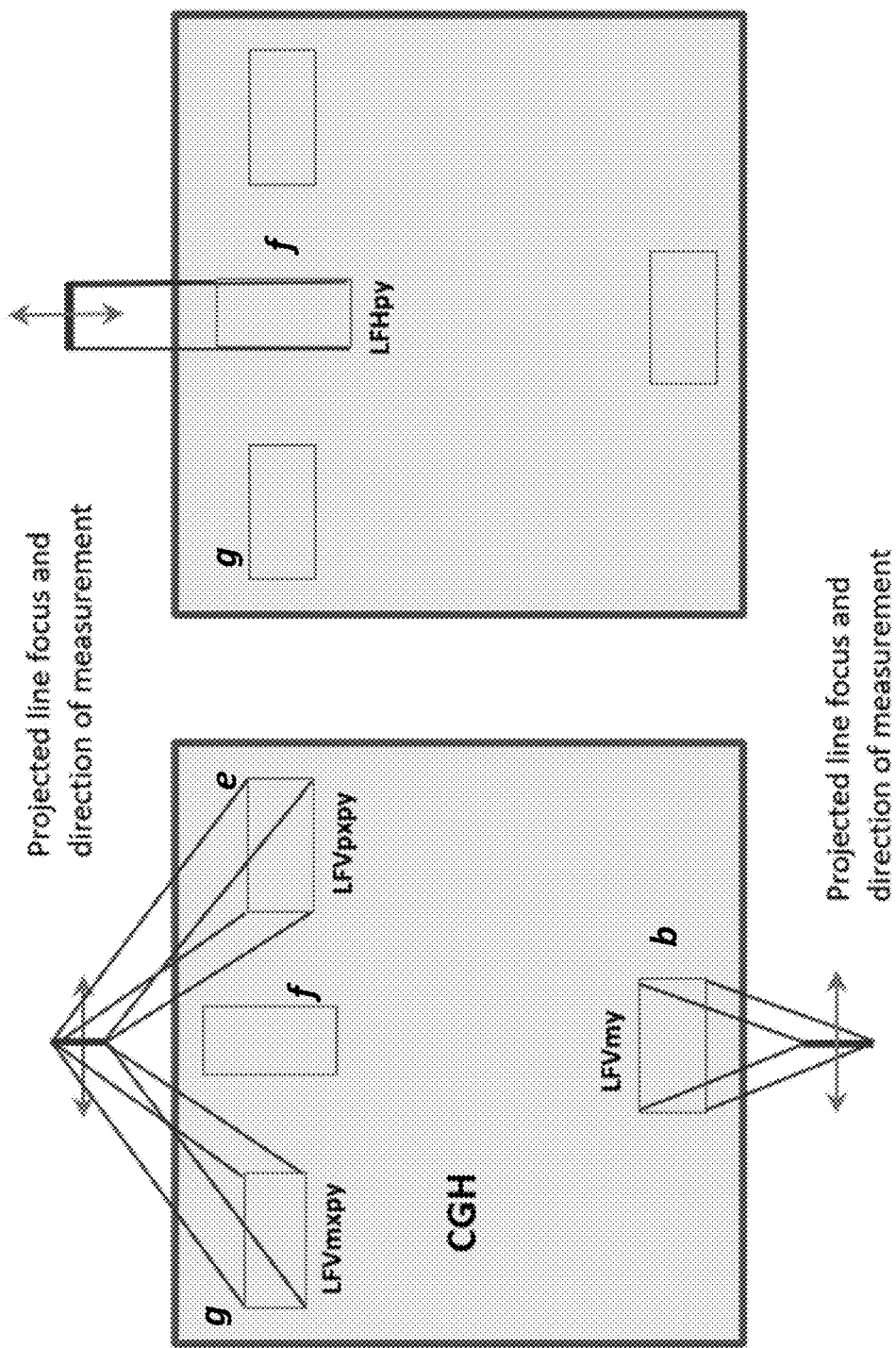

ALIGNMENT OF A MEASUREMENT OPTICAL SYSTEM AND A SAMPLE UNDER TEST

CROSS-REFERENCE TO RELATED APPLICATIONS

This US Patent Application is a national phase of the International Patent Application PCT/US2022/015409 published as WO 2022/170160 on Aug. 11, 2022, which claims priority from and benefit of the US Provisional Patent Application Nos. 63/146,685 filed on Feb. 7, 2021 and 63/252,510 filed on Oct. 5, 2021. The disclosure of each of the above-identified provisional patent applications is incorporated herein by reference in its entirety.

TECHNICAL FIELD

The present invention relates to methodologies for spatial alignment of a metrology frame, in which the sample under test (SUT; interchangeably referred to herein as an optical workpiece) may be removably secured and for interferometric measurement of the spatial profile of such SUT (once secured in the metrology frame) with an optical system containing a spatially-distinct layer of computer-generated holograms (CGHs) disposed between and in no physical contact with the source of light used for the measurement and the metrology frame and, in particular, to methodologies employing retroreflection of optical wavefront(s) delivered from the source of light to the metrology frame to carry out the required spatial alignment.

RELATED ART

Optical testing, performed with the use of a measurement optical system containing a CGH, requires that a workpiece (interchangeably: an optical workpiece, unit under test, UUT, or sample under test, SUT—be it a reflector, a lens, or another optical component the spatial profile of which one needs to identify) be placed correctly with respect to the optical wavefront, produced by and emanating from the CGH of the optical system and directed to and incident onto such SUT. (Such optical wavefront may be interchangeably referred to herein as "incident light"). The required correct placement of the SUT with respect to incident light is not arbitrary but is needed in all 6 degrees of freedom, DoFs (that is, in x-, y-, z-coordinates, as well as in angular space defined by $\theta x$, $\theta y$, and $\theta z$). A person of ordinary skill in the art will immediately recognize the practical "bottleneck" of this placement procedure: the alignment between the workpiece and the beam of light that has arrived from the source of light of the optical measurement system is often difficult to implement at least because the orientation of propagation of the beam of incident light itself towards the workpiece cannot be referenced directly by any mechanical measuring tool.

The use of wavefront sensing (in particular—optical interferometry and, specifically, phase-shifting interferometry)—with computer-generated hologram-based correction is recognized as a standard method for measuring aspheric surfaces.

Phase-shift interferometry is an established method for measuring a variety of physical parameters that range from the shape of optical components to the density of gas in aerodynamic flow fields. An interferometric wavefront sensor, which employs phase-shift interferometry, typically includes a temporally-coherent light source (such as a laser, for example), the light output from which is spatially split to define two optical wavefronts (a reference optical wavefront and a test or object optical wavefront) propagating along different optical paths and later recombined after traversing different path lengths. Upon the recombination, the relative phase difference between these two wavefronts manifests as a two-dimensional intensity pattern known as an interferogram. Phase-shift interferometers typically have an element in the path of the reference wavefront that is configured to introduce multiple (usually three or more) known phase-steps or phase-shifts into the reference wavefront. By acquiring, with an optical detector, the intensity patterns or interferograms corresponding to each of such phase-shifts, the phase distribution of the object wavefront can be quantitatively and rapidly calculated independently from the irradiance in the reference wavefront or the object wavefront.

An example 100 of the commercial phase-shifting interferometric system configured for testing optical components is schematically illustrated in FIG. 1A. Here, the optical system of the interferometer 110 (shown in this example as a Fizeau interferometer) spatially expands a light output from a laser source (not shown) to a collimated beam of light (not shown). An interchangeable Fizeau transmission sphere 114 changes the degree of collimation of this beam of light, converge the substantially-spherical optical wavefront 118 towards the focus 120 upon passing of which the spherical wavefront starts spatially expanding, 124, and at the same time, the transmission sphere 114 partially reflects (not shown) a portion of the collimated beam incident onto the sphere 114 back to the interferometer 110 to be used as the reference wavefront in the interferometric measurement. The object optical wavefront 124 from the interferometer is transformed by the holographic component or system 128 (often—the one containing a computer-generated hologram, or CGH) to the wavefront 132 that closely (or substantially) matches the spatial profile of the surface 136A of an optical component under test 136. The light reflected from or by this surface 136A (indicated with the double-headed arrow 140) propagates back through the CGH 128 into the interferometer 110, where it is combined with the light reflected into the interferometer by the reference surface. Fringes of interference (interferometric fringes, interferograms) formed as a result of such optical interference are imaged onto an optoelectronic sensor or optical detector (not shown) of the overall system. The light is shifted in phase as the sequence of discrete images are acquired. This sequence of images is used to determine the shape (or spatial profile) difference between the two interferometrically-combined wavefronts. By carefully controlling and calibrating the reference wavefront, the shape departure from the ideal (or desired, or targeted) for the surface 136A under test can then be determined as known in related art.

The recognized limitations of this methodology of measurement currently accepted and used in related art manifest, at least in part, in whether precise and repeatable spatial positioning of the aspheric surfaces with respect to the testing (measurement) wavefront 132 can be achieved: accuracy/repeatability/precision of such positioning, as will be readily understood by a skilled artisan, directly affects the spatial profile of the measurement wavefront at the moment of incidence onto the workpiece 136. (For example, optical wavefronts that are spatially expending will have a radius of curvature that increases as the wavefront propagates, so if the surface under test is positioned too far away from the CGH 128, the wavefront 132 will have a larger radius of curvature. A part 136 that ensures a null measurement in this situation necessarily has a radius of curvature of the surface 136A that is too large for practical use. This situation persists for aspherical as well as spherical wavefronts.) The challenges originate from the adoption of a variety of rather complex aspheric surfaces that are now required in production of optical systems that must achieve very high quality of optical imaging. Additional degrees of freedom beyond the spacing must be controlled in the test configuration for the accurate measurement of aspheric surfaces.

As a person of skill in the art will readily appreciate, the simplest aspheric surfaces are surfaces with shapes defined by conic sections of revolution, such as paraboloid, ellipsoid, and hyperboloid. For increased performance in the optical system, additional polynomial terms are often added to the function of revolution. Often, an optical system will use only an off-axis portion of such an axi-symmetric shape such that it is impractical to make or measure the full parent. A general class of aspheric surfaces are now being used that are called "freeform surfaces," which include can include nearly any smooth shape defined by numerical functions or even defined as grids of points. There remains an unsatisfied need in solutions for quick and precise alignment of the SUTs with aspherical surfaces that lend themselves to measurement en masse, with high throughput.

One way to achieve the required accuracy/precision/repeatability of alignment may include the use of a specialized metrology frame that itself contains an CGH (a secondary CGH with CGH-based references) that is configured to effectuate the measurement of the six DoFs of the metrology frame, and that also possesses judiciously-defined mechanical (fiducial or datum) structural features used to define the position of the SUT position on or at such metrology frame. (The examples of implementation of such metrology frame were disclosed in U.S. patent application Ser. No. 17/323,231 now published as US 2021/0361159, and for that reason are not discussed here in any detail; the disclosure of US 2021/0361159 is incorporated by reference herein.) Understandably, the use of this recently proposed approach requires not only a generation of a specific, task-dependent secondary CGH to be cooperated with the metrology frame (that carries the workpiece during the optical measurement) but also a proper spatial accommodation of such secondary CGH in the metrology frame itself with respect to some datum/fiducial references of the frame that identify a position of the workpiece in the frame. In other words, the use of the approach employing the metrology frame complemented with the secondary CHG(s) is at a minimum time involved and SUT-dependent, thereby leading to the need to judiciously re-accommodate the metrology frame for every new type of SUT. The complexity of this method of alignment of the metrology frame with respect to the incoming optical wavefront with the use of a generally workpiece-dependent begs a question of whether a substantially simpler—both from the point of view of fabrication and implementation—alignment framework can be devised.

SUMMARY

Embodiments of the invention provide various implementations of metrology frame and/or metrology platform utilizing such metrology frame and/or optical measurement system utilizing at least one of such metrology frame and metrology platform, as a well as methods for processing an optical component with the use of at least one of the metrology frame and/or the metrology platform and/or the optical measurement system.

The metrology frame has a reference axis and generally includes a carriage structured to contain a housing base and at least one retroreflector holder affixed to the housing base and configured to receive and support at least one optical retroreflector. Such metrology frame may additionally include the housing base that contains a set of fiducial structures and that is dimensioned to (optionally) receive and removably hold thereat an optical workpiece such that at least one of a first spatial position and a first spatial orientation of a first reference point of the optical workpiece is in a first pre-defined dimensional relationship with respect to the set of fiducial structures (here, at least one of present retroreflector holders may be configured to receive and removably hold thereat a corresponding optical retroreflector structure such that at least one of a second spatial position and a second spatial orientation of a second reference point of this optical retroreflector structure is in a second pre-defined dimensional relationship with respect to the set of fiducial structures). An optical retroreflector structure generally includes a corresponding optical retroreflector. In at least one embodiment, the metrology frame may additionally include a support base dimensioned to support the carriage attached to it such that at least one retroreflector holder is separated from the support base by said carriage; and at least one bearing cooperated with either the carriage or the support base and configured to moveably vary a least one of a mutual position and a mutual orientation of the support base and the carriage. Furthermore—and in at least one of the above-identified embodiments—the second pre-defined spatial relationship may be defined as including a separation distance (as measured in a plane of the housing base, for example) between the at least one optical retroreflector structure and the set of fiducial references, and/or at least one optical retroreflector structure may be configured to removably fit at a corresponding retroreflector holder with the second pre-defined dimensional relationship requirement being not only met but also substantially maintained and not changed each time such optical retroreflector is cooperated with the housing base.

Alternatively or in addition, and substantially in every embodiment of the invention, at least two optical retroreflectors are necessarily employed and positioned at the carriage at different first and second azimuthal angles as viewed from a point of intersection between the reference axis and the plane of the carriage. Alternatively or in addition, and in at least one embodiment, a retroreflector may include a corner-cube retroreflector; and/or an optical retroreflector structure may include a sphere-mounted corner-cube retroreflector; and/or an optical retroreflector structure may include a corresponding collar holder (dimensioned to support the optical retroreflector and to fit into a hole of the corresponding retroreflector holder, which hole has a hole axis that defines the separation distance); and/or an optical retroreflector may be configured as a Cat's Eye retroreflector; and/or an optical retroreflector is a device configured to utilize phase conjugation to retroreflect light incident thereon. In the specific case when the collar holder is used, the collar holder may be configured to include a foot dimensioned to fit in the hole of the retroreflector holder and a shoulder plate that is carried by the foot and that has a thickness which, together with the separation distance, defines the second spatial position. Alternatively or in addition, and substantially in every embodiment of the invention, the carriage may include at least one screen carried by the housing base, and/or the set of fiducial references may include at least one structural protrusion extending from a plane of the housing base. In every embodiment, the metrology frame does not contain any holographic element juxtaposed with or connected to the metrology frame.

According to the idea of the invention, an embodiment of the metrology platform typically includes an embodiment of the metrology frame and a hologram (preferably, carried by or in an optically-transparent substrate) that has at least one primary holographic region defined to form, in transmission through such region, at least one corresponding spatially-converging optical wavefront when irradiated with an input beam of light. Preferably, such converging wavefront is a non-spherical optical wavefront and even more preferably—a substantially cylindrical wavefront. (In a specific case of the latter, the corresponding primary holographic region of the hologram is defined to form the spatially-converging cylindrical wavefront that possesses tilt non-uniformly distributed across such wavefront). When the hologram is carried by the substrate, the metrology platform may include a substrate holder having a substrate holder frame to which the optically-transparent substrate is affixed and equipped with at least one substrate holder bearing enabling linear and/or angular translation of the substrate holder frame with the optically-transparent substrate within the substrate holder. In at least one case, at least one primary holographic region is defined to form a spatially-converging optical wavefront characterized by a first line focus aligned with a first axis and/or a spatially-converging optical wavefront characterized by a second line focus aligned with a first axis. (Generally, the second axis being transverse to the first axis). The metrology frame and the hologram in a given metrology platform are preferably spatially aligned such that light corresponding to at least one spatially converging optical wavefront formed by respectively-corresponding at least one primary holographic region enters an aperture of corresponding at least one optical retroreflector. In at least one implementation, the hologram may be configured to additionally include a secondary alignment holographic region defined to form, in reflection from such region, a reflected alignment optical wavefront when irradiated with the input beam of light. Alternatively or in addition, and in at least one implementation of the metrology platform, at least one primary holographic region of the hologram may include at least two primary holographic regions that are configured to form (when irradiated with the input beam of light) at least two respectively-corresponding optical wavefronts each of which converges towards a corresponding line focus and is directed, in operation of the metrology platform, towards a respective one from present at least two optical retroreflectors that are located at the carriage at different first and second azimuthal angles.

Embodiment of the invention additionally provide an optical measurement system that includes, in addition to an embodiment of the metrology platform, a wavefront sensor configured to generate the input beam of light having an input axis (the metrology platform is then disposed to intersect the light from the input beam of light such that the metrology frame is spatially separated from the wavefront sensor by the hologram of the metrology platform). In substantially every embodiment of the optical measurement system, the hologram of the metrology platform is the only present hologram.

Embodiments additionally provide a method for processing an optical component with the use of an embodiment of the optical measurement system, by taking at least the steps of a) irradiating at least one optical retroreflector with at least one spatially-converging optical wavefront produced by the hologram; b) forming an initial image based at least in part on acquisition of light from said at least one spatially-converging optical wavefront that has been reflected by the at least one optical retroreflector back to the wavefront sensor; and c) assessing at least one of spatial tilt, azimuthal angular deviation, transverse shift, and longitudinal shift of the at least one of optical retroreflector with respect to said spatially-converging optical wavefront based on the initial image. An embodiment of the method may additionally include a step of spatially re-aligning at least one optical retroreflector to transform the initial image to a resulting image that is substantially devoid of (that is, does not contain) image features representing at least one of misalignment of spatial tilt, azimuthal angular deviation, transverse shift, and longitudinal shift, thereby eliminating these misalignments. Alternatively or in addition, and substantially in every embodiment of the method, the wavefront sensor may include an optical interferometer; the initial image and the resulting may include corresponding interferograms; and an image feature may contain an interferometric fringe. In at least one case, the step of irradiating may include overlapping a line focus formed by at least one spatially-converging optical wavefront with at least one retroreflector and/or illuminating at least one retroreflector with a spatially-converging cylindrical wavefront possessing tilt non-uniformly distributed across such wavefront. Alternatively or in addition, and practically every implementation the method may further include, prior to the step of irradiating, a step of forming an auxiliary initial image based at least in part on acquisition of light from the reflected alignment optical wavefront; and a step of repositioning the hologram with respect to the input axis of the input beam of light to substantially eliminate from the auxiliary initial image any image features representing at least one of misalignments of spatial tilt, azimuthal angular deviation, transverse shift, and longitudinal shift of the hologram with respect to the input beam of light.

In at least one implementation of the method, the step of irradiating at least one optical retroreflector may include irradiating such retroreflector with more than one spatially converging optical wavefronts produced the hologram, and the step of eliminating at least one of spatial tilt, azimuthal angular deviation, transverse shift, and longitudinal shift may include at least one of: i) substantially co-locating a reference point of the at least one optical retroreflector with the first line focus and/or the second line focus; ii) producing a first initial image, formed based at least in part on acquisition of light from the input beam of light that has been reflected by a first optical retroreflector and producing a second initial image, formed based at least in part on acquisition of light from the input beam of light that has been reflected by a second optical retroreflector (here, the first and second optical retroreflectors are positioned at two different azimuthal locations as viewed from the point of intersection of the reference axis with the plane of the carriage). In at least one specific case of the latter, the first initial image is formed based at least in part on acquisition of light from the input beam of light that has been reflected by the first optical retroreflector through the optically-transparent substrate, and/or the second initial image is formed based at least in part on acquisition of light from the input beam of light that has been reflected by the second optical retroreflector through the optically-transparent substrate.

In at least one embodiment of the method, an optical retroreflector may be configured to include a corner-cube retroreflector, and/or the process of co-locating may include co-locating an apex of a corner-cube retroreflector with the first line focus and/or the second line focus. Additionally or in the alternative, the embodiment of the method may include a step of affixing the optical workpiece to the metrology frame of the optical measurement system in the first pre-defined relationship with respect to a set of fiducial structures carried by the housing base. In this case, the step of spatially re-aligning at least one optical retroreflector may include spatially re-aligning such retroreflector without changing mutual positioning and mutual orientation between the retroreflector and the optical workpiece. In this case, the embodiment of the method may include a step of assessing a spatial profile and/or a shape of the optical workpiece from a target interferometric optical image formed with the use of a portion of the input beam of light that has been transformed by the hologram and reflected by the optical workpiece.

Within the scope of the invention there is use of an embodiment of the metrology platform and/or an embodiment of the method with at least one of alignment telescope, theodolite, optical autocollimator, and a point source microscope; and/or use of an embodiment of metrology platform and/or an embodiment of the method for curvature sensing and/or wavefront sensing utilizing amplitude or phase modulation; and/or use of an embodiment of metrology platform and/or an embodiment of the method for measurement of a position of an object in a 3D space. Furthermore, embodiments provide use of an embodiment of metrology platform and/or an embodiment of the method in which at least one retroreflector is replaced with a combination of two substantially planar mirrors forming an optical roof, for measuring a deviation of a position of a first line focus a first chosen axis and an angular deviation of a second line focus along a second chosen axis; and/or for measuring a rotation of the optical roof about an optical line of sight.

BRIEF DESCRIPTION OF THE DRAWINGS

The invention will be more fully understood by referring to the following Detailed Description of Specific Embodiments in conjunction with the not-to scale Drawings, of which:

FIGS. 4A, 4B provide schematic illustrations of shaping of the optical wavefront with a hologram of an embodiment of the metrology platform to produce single or multiple cylindrical optical wavefronts.

FIGS. 5A, 5B depict the use of the substantially cylindrical optical wavefront for transverse alignment of the retroreflector of the metrology frame (and with it—of the metrology frame itself and of the optical workpiece if such workpiece has been pre-attached in a known spatial position and orientation to the metrology frame).

FIGS. 6A, 6B, 6C, and 6D provide a sequence of interferometric images formed during the procedure of transverse/lateral alignment of the retroreflector (and with it—of the metrology frame itself and of the optical workpiece if such workpiece has been pre-attached in a known spatial position and orientation to the metrology frame) along a chosen axis transverse to the optical axis of the optical measurement system.

FIG. 7 presents an interferometric image formed by an embodiment of the optical measurement system of the invention that is equipped with an embodiment of the metrology platform configured according to the idea of the invention.

FIGS. 8A, 8B, 9A, 9B, 9C, 9D provide schematics illustrating elements of an embodiment of the procedure of the alignment of the metrology frame configured according to the idea of the invention (and with it—of the optical workpiece if and when such workpiece has been pre-attached in a known spatial position and orientation to the metrology frame) with the use of an embodiment of the optical measurement system equipped with such metrology frame

Figure 1:
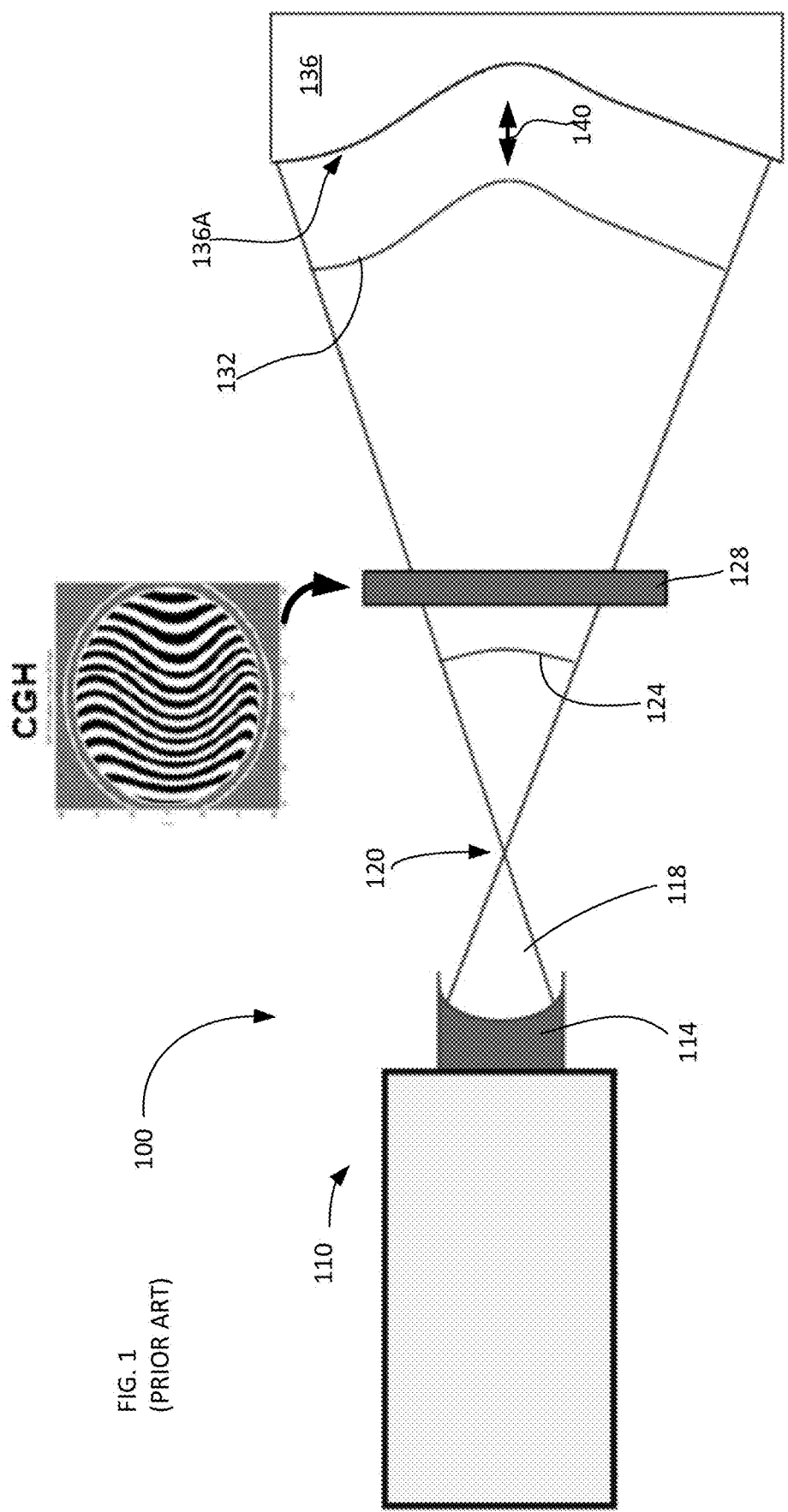
FIG. 1A schematically illustrates a conventional methodology of assessing an optical wavefront representing an optical workpiece with the use of CGH-based interferometric system.
FIGS. 1B, 1C, 1D are illustrations of a corner-cube-type retroreflector, a Cat's eye retroreflector, and a sphere-mounted retroreflector, respectively.

Generally, the sizes and relative scales of elements in Drawings may be set to be different from actual ones to appropriately facilitate simplicity, clarity, and understanding of the Drawings. For the same reason, not all elements present in one Drawing may necessarily be shown in another.

DETAILED DESCRIPTION

The skilled artisan having an advantage of this disclosure will appreciate that embodiments of the present invention address systems and methodologies enabling and employing a determination, with a high degree of accuracy, of a spatial position of a retroreflector with the use of a focus of a generally non-spherical (and in at least one specific case—a substantially cylindrical) wavefront is formed by a dedicated optical element: a hologram, a refractive optical element (such as a lens), or a reflective optical element (such as a curved mirror), to name just a few.

In the case when a substantially cylindrical wavefront is formed and used, such optical wavefront converges to a substantially line-shaped focus in space. This line-shaped focal distribution of light can be easily observed visually if, for example, a white surface, such as a piece of paper is placed as a screen at the focus. Likewise, parameters or characteristic of light distribution at the line focus can be measured by exposing a light-sensitive film to such distribution, or converting this light distribution into an electronic signal with an electronic detector array, such as those used in digital cameras, for example.

When this substantially cylindrical wavefront that creates the line focus is incident on a retroreflector such that the line of the line focus is positioned to substantially precisely cross the vertex of the retroreflector, according to the idea of the present invention, the light will be reflected back into a diverging cylindrical wavefront as though it was created by a linear light source located at the retroreflector's vertex, exactly coincident with the line focus from the incident cylindrical wavefront. If the retroreflector is shifted by a certain distance r away from the position of the line focus in any direction substantially perpendicular to the direction of the line focus (here, r is generally a vector quantity), then the light reflected back by the retroreflector appears as a cylindrical wavefront emanating from a "line source" that is displaced by a distance of exactly 2r from the location of the line focus. Substantially any type of wavefront sensor can be used to receive and measure light arriving at the wavefront sensor from the this "shifted" line distribution of optical power to determine the precise offset r between the line focus and the retroreflector vertex.

This physical effect is not recognized in related art up to date, and—according to the idea of the invention—this effect has now been implemented in practice to enable the use of at least a combination of (a projected line focus of a beam of light with a retroreflector and with a wavefront sensor) for determination of at least the position and/or orientation of a retroreflector in space, to high accuracy. Furthermore, according to the idea of the invention, the use of a plurality of substantially cylindrical wavefronts was demonstrated to effectuate measurement of positions of multiple retroreflectors which, in turn, was employed—according to the idea of the invention—to determine position and/or orientation of any and every object.

The discussion below is presented in reference to a couple of specifics examples of used hardware, and in reference to the preferred substantially cylindrical wavefronts. The person of skill in the art will recognize, however, that these specific examples are not intended to limit a more general scope of the invention.

Implementations of the proposed idea allow the user to spatially align not only the metrology frame within the optical measurement system but also the workpiece, juxtaposed with the metrology frame, with respect to the beam of light used for optical characterization of the workpiece while avoiding the use of a custom made secondary CGH associated with the metrology frame containing and, instead, rely on a commonly-available optical device juxtaposed with the metrology frame. The idea of the invention stems from the realization that the use of an optical retroreflector—an optical component dimensioned to cause any ray of light incident onto the retroreflector to be reflected in a direction exactly opposite from whence it came—to send a reflected portion of an optical wavefront incident onto the workpiece in the metrology frame does not require spatial referencing or determination of spatial orientation of the incident light by the very nature of operation of the optical retroreflector.

Figures 1B, 1C:
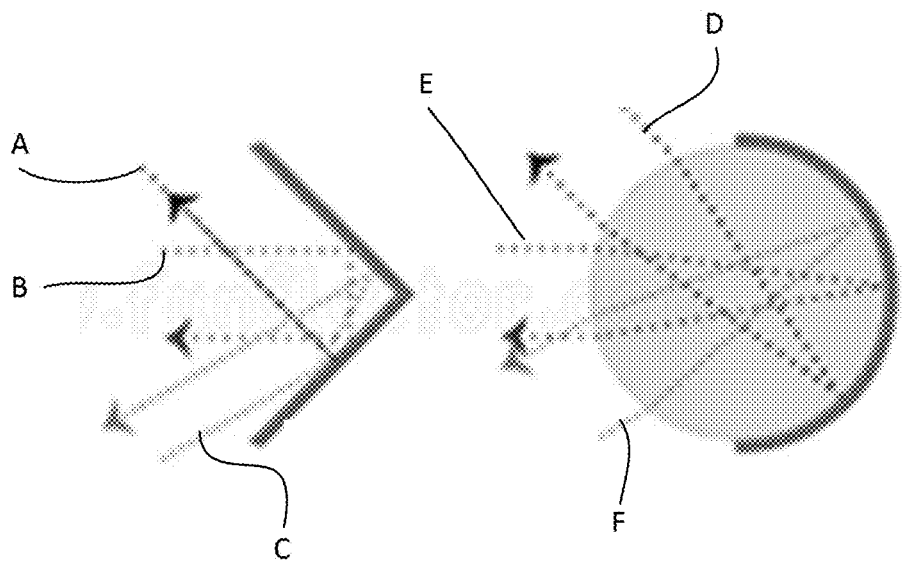
Figure 1D:
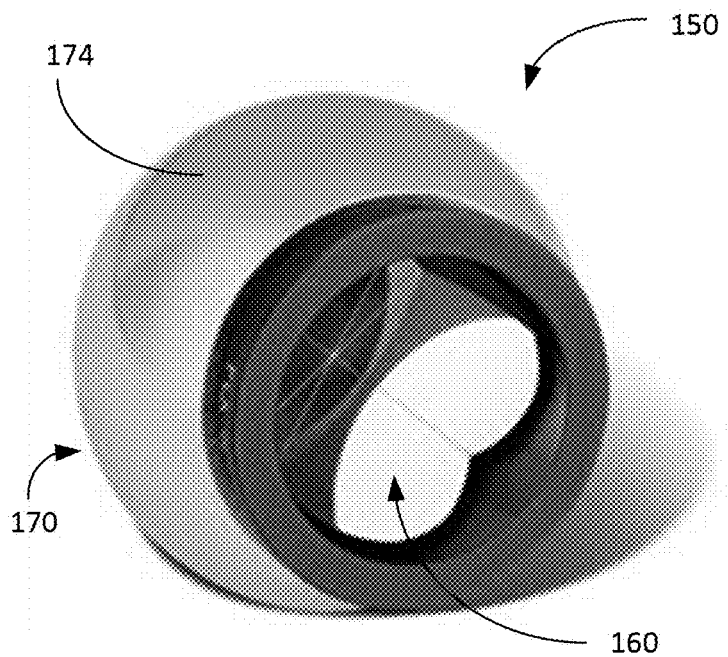

While retroreflecting incident light, a retroreflector (see, for example, en.wikipedia.org/wiki/Retroreflector) generally shifts a reflected optical beam or ray transversely with respect to the beam or ray of incident light (see a schematic of FIGS. 1B, 1C, where different incident rays of light are denoted as A, B, C, D, E, and F). Taking the center of the retroreflector as the origin and z as the direction of propagation, any ray that is offset from the vertex by (x,y) will be reflected so that the emerging ray is offset by (−x, −y). A typical corner-cube type retroreflector (a cross-sectional view of which is schematically shown in FIG. 1B) possesses discrete rotational symmetry about an axis that passes through the vertex (or apex) of such retroreflector. Rotational symmetry (also sometimes referred to as radial symmetry), is the property a shape has when it looks the same after some rotation by a partial turn. An object's degree (or order, or fold) of rotational symmetry is the number of distinct orientations in which it looks exactly the same for each rotation. Understandably, the corner-cube retroreflector possesses a 3-fold rotational symmetry, since rotation by an angle of 360°/3 about the axis passing through vertex of the retroreflector does not change the looks of it. (A skilled artisan understands well the principle of operation of either a corner-cube—or prismatic—retroreflector that uses reflection from three reflecting surfaces disposed at right angles with respect to one another, as well as a Cat's eye retroreflector that brings incident light to focus on a reflective surface, and for that reason the operation of a retroreflector—aside from some minute details—is not presented here). One specific implementation of a retroreflector is a so-called Spherically Mounted Retroreflector (or Sphere-Mounted Retroreflector, or SMR), which is a retroreflector (typically—of a corner-cube variety) housed in a metal shell having an outer spherically-shaped surface. The common intersection point of the three mutually perpendicular mirrors of the SMR (in the case when the corner-cube retroreflector is used), or vertex or apex of the retroreflector is located within and on an axis of the spherical shell with a high precision at a known distance from a reference point of the outer surface of the spherical shell. The schematic illustration of the SMR 150 is shown in FIG. 1D, where a corner-cube retroreflector optical element 160 is mounted in the housing spherical shell 170 so the apex V of the cube coincides with a known point of this housing shell—for example, with the center of the shell 170 of known roundness and diameter. In use, the outer surface 174 of the shell 170 is positioned to appropriately contact—for example, touch—a dedicated mechanical surface, thereby transferring the knowledge of the position of the corner-cube apex V to the component that includes this dedicated mechanical surface. As known in the art, the metal sphere of an SMR is graded to describe the dimensional properties of the SMR. One common grade for the SMR is Grade 25, which refers to sphericity in millionths of an inch (0.000025 inches). This Grade has a surface roughness tolerance of no more than 0.000002 inches and a diameter tolerance of +/−0.0001 inches.

Retroreflectors (including Cat's eye retroreflector and a corner-cube retroreflector) are usually used to reflect substantially collimated light (possessing a substantially planar optical wavefront), in which case only the angles of propagation of such incident light with respect to a retroreflector are of consequence. A person of ordinary skill in the art appreciates that, if used with a spatially converging incident beam of light, a retroreflector will reflect each optical ray as described above, but the net effect of the reflection process produces an optical image. If the incident light is coming to a focus at a point (x, y, z) in coordinates centered on or at the vertex of the corner-cube retroreflector (CCR), for example, then the reflected light will appear as if it originated at point (−x, −y, −z). Only if the light incident onto the corner-cube retroreflector is focused at (0,0,0)—that is, exactly and precisely on the point V corresponding to the vertex of such CCR—will the incident light be autoreflected exactly back upon itself. If the light is autoreflected from such vertex point and the retroreflector moves or is moved by a chosen distance (say, 1 mm) in any direction, the apparent image will shift by twice such distance (in this case—by 2 mm) in that same direction, so the incident light is focused 1 mm from the vertex and image is 1 mm from the vertex on the opposite side.

According to one implementation of the idea of the invention, an optical retroreflector is judiciously cooperated, in a known pre-defined spatial relationship, with a metrology frame carrying (or configured to carry) a workpiece that has to be optically measured with an incident beam of light emanating from the dedicated source of light of the optical measurement system. (In one case, for example, the structural cooperation between the retroreflector device and the metrology frame is dimensioned such that a position of the vertex/apex of the retroreflector with respect to a pre-defined reference feature of the metrology frame is not only dimensionally known but also is maintained unchanged.) Then, as long as the measurement methodology allows for precise determination of spatial location of retroreflector's vertex/apex with the use of the optical measurement system, the spatial relationship between the workpiece and an element of the optical measurement system is unmistakably and unambiguously derived.

Implementations of the idea of the invention may employ an optical wavefront sensor—and, in a specific case, the one based on an interferometric system—configured for measuring various optical surfaces and optical systems. (Generally, the interferometer-based optical measurement systems are known to have high precision and vary small dynamic range in that, after being reflection at the workpiece being measured, each light ray much nearly precisely retrace its path back into the interferometer to thereby produce a practically-meaningful measurement).

For the purposes of this disclosure and unless expressly stated otherwise, the term metrology frame refers to a mechanical housing system that is structured to removably accommodate and movably support, once accommodated, a target workpiece (an optical component, whether a conventionally-shaped, spherical or aspherical, optical workpiece, or a freeform or anamorphic optical workpiece as identified in the art by, for example, centerfreeformoptics.org/what-is-freeform-optics), which is subject to an optical measurement discussed in this disclosure and to provide spatially fixed, pre-determined, and substantially unchangeable structural references and/or interfaces configured to necessarily establish dimensionally-predefined, repeatable from one measurement to another relative positioning between a chosen component of the platform system and both the target workpiece and one or more auxiliary elements (such as retroreflector elements) that are removably affixed to the same platform system. Optionally, as discussed below, the metrology frame between the workpiece and the chosen component may interlace through such components as the carriage(s), scale(s), ballscrews(s)/mechanical repositioner(s), and a support frame, to name just a few. A carriage may be represented, in a non-limiting example, by a moving component designed for positioning/carrying parts, tools, probes and/or other carriages with respect to one another; a scale is understood to be a measurement reference objects that possesses graduated marks and/or other detectable divisions for reading using mechanical, electrical, and/or optical approaches. A non-limiting example of a ballscrew or a mechanical repositioner is provided by a threaded shaft/screw used for positioning a carriage along a way via a ballnut (in practice, the ballscrew may be rotated to a specific encoder reading by a servo motor). A support base, as used herein, is defined and referred to as a mechanical structure configured to provide support to elements and devices at hand.

As will be understood from the detailed description below, the optical measurement system for spatial surface profiling of a target workpiece or SUT includes a wavefront sensor device (containing the source of light of the measurement system) in combination with a hologram (often—the computer-generated hologram, CGH) disposed between the source of light and the metrology frame to which the workpiece is attached for the surface profiling to be carried out. The combination of the metrology frame with the hologram (optionally juxtaposed with the appropriate holder allowing for fixating and/or repositioning of the hologram with respect to the chosen system of coordinates) may me referred herein as a metrology platform.

In one implementation of the idea of the invention, the ideal retroreflector-based structure or device (generally—the one containing any type of retroreflector; optionally—the one containing a corner-cube-based retroreflector) is structurally cooperated (in a known spatial relationship) with the metrology frame carrying a workpiece of interest. The metrology frame is positioned such as to intersect a spatially-converging beam of light (defined via its F-number, FN, which is a ratio of a distance from focus to the pupil of the optical system to the pupil diameter) that is directed towards the metrology frame from the interferometer-based optical measurement system and that is converging towards the vertex of the retroreflector. In one case, to ensure the stability and invariability of structural cooperation between the retroreflector and the metrology frame, the retroreflector structure is supported by a retroreflector holder the dimensions of which are precisely known in relation to a reference point of the retroreflector structure (in a specific case—in relation to the vertex of the corner-cube retroreflector of the retroreflector structure).

Figure 2A:
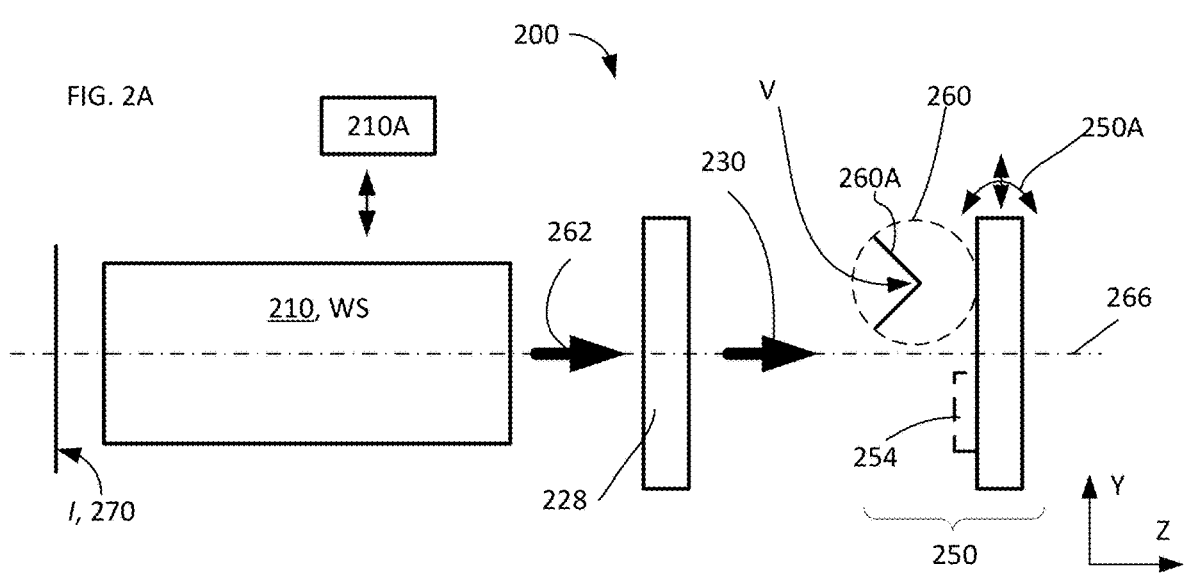
FIGS. 2A, 2B schematically illustrate embodiments of an optical measurement system configured according to the idea of the invention.

As shown schematically in FIG. 2A, the specific embodiment 200 of the optical measurement system structured according to the idea of the invention includes the optical wavefront sensor WS, 210—a device configured to measure aberration of an optical wavefront; in a specific case—the interferometer-based wavefront sensor. The principle of operation of an interferometric wavefront sensor is well known in the art and for that reason is not discussed here in any detail. The wavefront sensor 210 contains the appropriately-configured source of light (not explicitly shown; for example, laser light) used by the optical measurement system 200. The optical measurement system 200 additionally includes the metrology frame 250 that is structured to carry an/or support a workpiece of interest (not shown) and at least one optical retroreflector structure that is schematically shown as 260 (and containing the optical retroreflector, which in the example of FIG. 2A is shown as a corner-cube retroreflector, CCR, 260A). The spatial degrees of freedom/repositioning of the frame 250 (whether angularly or translationally) are schematically illustrated with the arrows 250A. The optical measurement system 200 may additionally include, the optical system 228 disposed between the wavefront sensor 210 and the metrology frame 250, which system is configured to define a shape and the wavefront of the beam of light 230 delivered in the direction of the metrology frame 250. In at least one case, the operation of at least the system 210 and, preferably, the system 228 and/or the metrology frame 250 is covered by a microprocessor (an electronic circuitry judiciously programmed to effectuate steps required for coordination of the sub-systems of the measurement system 200 and/or for performing optical measurements and/or for storing results of the optical measurements).

A skilled person will immediately recognize, from some simple considerations, all the advantages of using the retroreflector with the metrology frame to achieve the reliable and repeatable alignment of the metrology frame and/or the optical workpiece at the metrology frame with respect to a chosen beam of light. Consider, for simplicity, that the direction of propagation of the spatially converging at the vertex V of the retroreflector 266A incident beam of light 230, delivered from the source of light of the optical system 200, corresponds to and coincides with the local z-axis 266 (such as the optical axis of the system 200), while the metrology frame 250 is positioned such as to have the retroreflector 266A receive and reflect the beam 230. In this specific case, the incident light 230 is returned upon itself into the wavefront sensor 210 with a substantially flat/planar wavefront and provides a 'null' measurement. The results of the null measurement are represented, at the chosen image plane of the optical system 200 (in this example—plane I, 270), by an image of the vertex point of the retroreflector with a light distribution displaying no interferometric fringes. As a person of skill will readily appreciate, the image plane can be defined in a different location from that of plant 270 as long as the optical measurement system is structured to ensure that the reference beam of light from the interferometer/wavefront sensor and the sample beam of light returned from the metrology frame are made to optically interfere in this plane.

If the retroreflector 266A is now moved away from such "null" position (at which the incident beam is focused at the vertex point V of the retroreflector 266A) along the direction of propagation of the incident beam of light 230 by a spatial increment dz, then the point image of the vertex V at the image plane I, 270 will move along the z-axis by 2dz. In this case, the reflected back to the wavefront sensor 210 optical wavefront will have the quadratic shape of power with magnitude of $dz/(4FN^2)$. If, instead, the retroreflector 260 is moved in the direction perpendicular to the z-axis by a distance dy, for example, the reflected wavefront will have the shape corresponding to spatial tilt with magnitude $2dy/FN$.

A skilled artisan will now appreciate that optical wavefront variations as small as one-tenth of an interferometric fringe (which is equivalent to wavefront variation with magnitude $1/10$ of the operational wavelength of light) can be recognized and measured with the proposed embodiment of the metrology frame. For a 0.63-micron wavelength of light used in many conventional interferometric measurement systems, this scales to be an optical wavefront variation on the spatial scale of 0.063 micron. If incident beam of light 230 is now pre-shaped by a judiciously-defined CGH of the optical system 228 from a 1 cm diameter hologram region and is brought to focus at a distance of 10 cm down the z-axis from the system 228, then the F-number of such converging beam is FN=10. For this case, resolving $1/10$ of an interferometric fringe in the interferometric image at the plane 270 would allow the user to detect a change in the position of the retroreflector 266A of about 0.3 micron along the y-axis (or along the x-axis) and about 25 microns along the z-axis. (It is appreciated that while the measurement of the axial position of the retroreflector 266—and with it, the metrology frame 250 and the associated workpiece, shown in a dashed line 254—is somewhat limited due to the possibly large values of F-numbers of the incident beam of light 230, caused by small sized of operational patches of the hologram at 228, the ability to measure its lateral position(s) is rather extraordinary: sub-micron measurements can be performed simply "by eye", which is improved at least 100-fold by electronically capturing the interferogram with the use of the sensor 210 and associated electronic circuitry and processing the collected data with a programmable processor, 210A)

According to the idea of the invention—and once the metrology frame 250 with the affixed to it retroreflector-containing structure 260 has been axially and laterally aligned with respect to the incident beam 230—at the following step of the alignment procedure the angular tilt(s) are defined and compensated/corrected based on tilt interferometric fringes observed at the imaging plane 270 at the output from the wavefront sensor 210, thereby resulting in a substantially perfect alignment of the retroreflector 266A with respect to the portion of the optical system 200 preceding the metrology frame 250 in the now-known spatial orientation. If and/or when the workpiece of interest has been pre-attached to the metrology frame prior to the alignment procedure in a fixed and known spatial relationship with respect to the metrology frame 250, and if and/or when the retroreflector 266A is cooperated with the frame 250 in a fixed and known spatial relationship, the alignment of the retroreflector 266A itself can now be reliably used to determine the position and orientation of the workpiece.

The metrology frame 250, according to the idea of the invention, generally includes at least a carriage and, preferably, additionally a support base and at least one bearing, as discussed in more detail below. (A general bearing arrangement—or bearing, for short—which is conventionally understood in related art to be a machine element that constrains relative motion to only the desired motion, and also preferably reduces friction between moving parts. See, for example, en.wikipedia.org/wiki/bearing_(mechanical). The design of the bearing may, for example, provide for free linear movement of the moving part or for free rotation around a fixed axis; or, it may prevent a motion by controlling the vectors of normal forces that bear on the moving parts. Bearings are classified broadly according to the type of operation, the motions allowed, or to the directions of the loads (forces) applied to the parts. Non-limiting examples of arrangements of a bearing that may be used for the purposes discussed in this disclosure include a linear bearing, a sliding bearing in which one mechanical element such as a cylinder or a piston is repositioned within another mechanical element such as a hollow tubular element, a bearing utilizing a pair of threads, a hinge, a contraption employing a used of piezo-electric crystal, and hydraulic pressure system, a servo motor, to name just a few.) In one example, the system 228 may be an optical lens and an optical mirror; in another—a judiciously structured hologram (for example, a CGH). When the optical system 228 include a hologram, such hologram may be structured to include multiple spatially distinct from one another holographic regions carried by an optically-transparent substrate. There may be a primary alignment holographic region defined to form, in reflection, a primary alignment optical wavefront when irradiated with an input beam of light (such as the beam 262 from the source of light within the interferometer-based system 210) incident onto the primary alignment holographic region. The hologram may additionally or alternatively include at least one secondary holographic region defined to form, in transmission, a corresponding spatially converging optical wavefront when irradiated with the input beam of light. To mechanically support the optical system 228, an appropriate mechanical holder may be used. (For example, in the case of a hologram it may be a substrate holder having a substrate holder frame to which the optically-transparent substrate is affixed and equipped with at least one substrate holder bearing enabling linear and/or angular translation of the substrate holder frame with the optically-transparent substrate within the substrate holder.) The workpiece subject to optical measurement with the optical system 200 is shown as 254 after having been removably affixed to the metrology frame 250.

The practical question arises how the determination of the position and orientation of the workpiece on the metrology frame can be made with respect to the retroreflector that is already aligned with respect to the incident optical wavefront. The answer to this question turns on (i) devising a contraption allowing to position the metrology frame in a known, measured, and kept unchangeable (or fixed, during the process of optical measurement) orientation with respect to the retroreflector and (ii) affixing the workpiece to be measured to the metrology frame in a known position and orientation with respect to the metrology frame.

In embodiments of the invention, the latter is ensured by structuring the metrology frame to contain pre-determined and pre-dimensioned fiducial structural features and disposing the workpiece in a predetermined fashion with respect to such features. The former, on the other hand, is approached, for example, by finding a way to repeatably position a reference point of the retroreflector (for example, the apex/vertex of the CCR) with respect to the metrology frame.

Figure 2B:
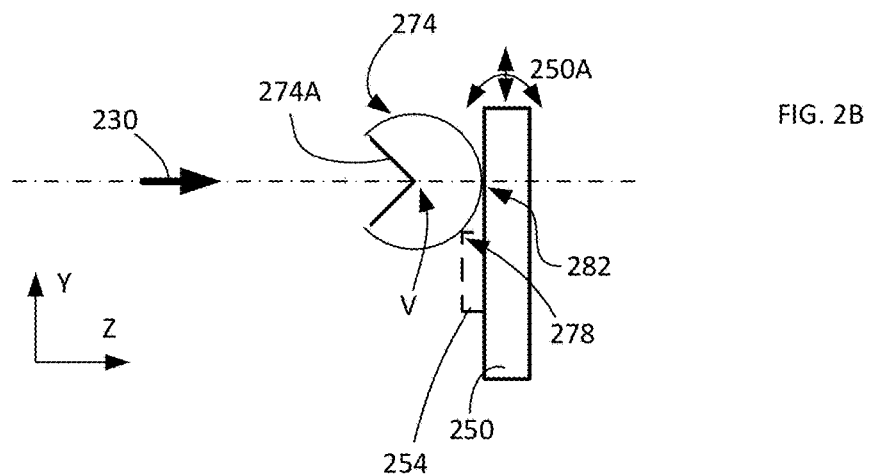

To this end, and in reference to the schematic of FIG. 2B (illustrating a specific example of a portion of the system 200 of FIG. 2A, which employs an SMR 274 as part of the retroreflector structure 266), in one practical non-limiting example the optical system 228 can be designed to focus light 230 onto a known location exactly one radius of the SMR's shell from the edge of the workpiece 254 that has been disposed on the metrology frame 250. The SMR 274 (containing the CCR 274A) in this case is mounted such as to touch the edge 278 of the optic 254 with the outer surface of the SMR and the agreed upon location 282 of the metrology frame 250. The spatially-unchanged combination of the metrology frame 250, the optic 254, and the SMR 274 can then be repositioned with respect to the incident beam of light 230 until the reflected from the CCR 274A of the SMR 274 is aligned in the interferometer 210.

Examples of Embodiments of Portions of the Optical Measurement System.

Figure 3A:
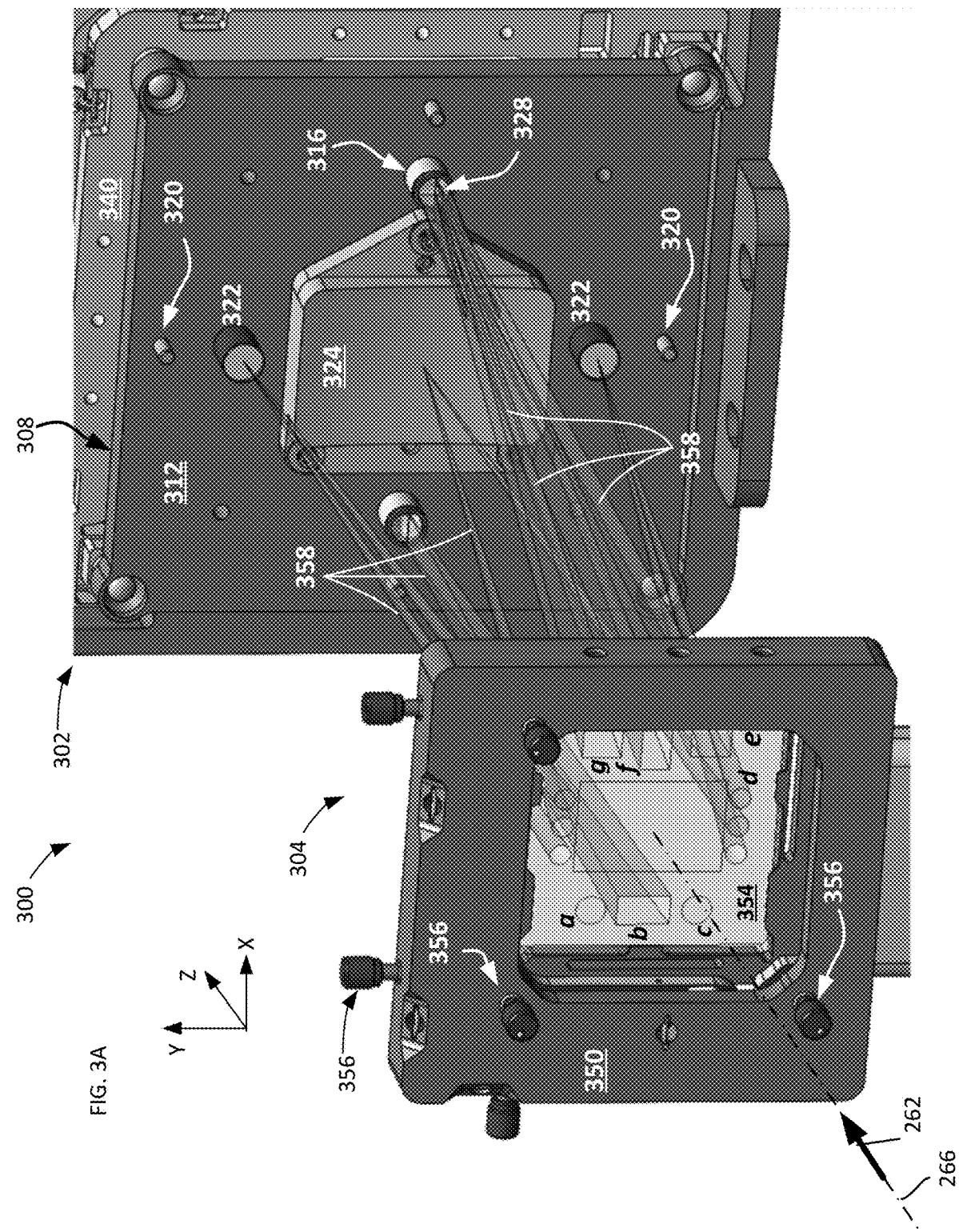
FIG. 3A schematically shows a metrology platform (including a metrology frame and an optical system containing a hologram) used as part of an embodiment of the optical measurement system FIG. 3B provides a view of a portion of an embodiment of the metrology frame.
Figure 3C:
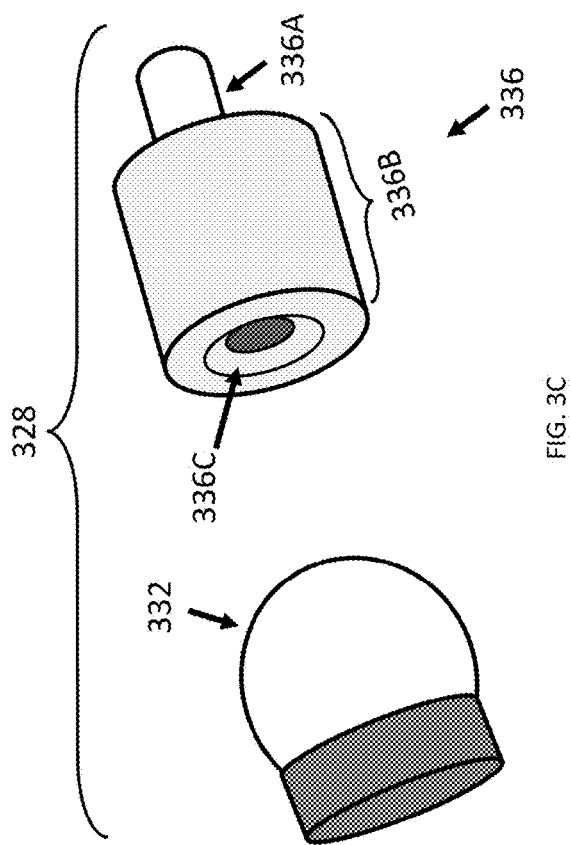
FIG. 3C includes images of the sphere-mounted retroreflector (SMR) and a portion of a SMR-mounting structure used for removably affixing the SMR to the metrology frame.
Figure 3B:
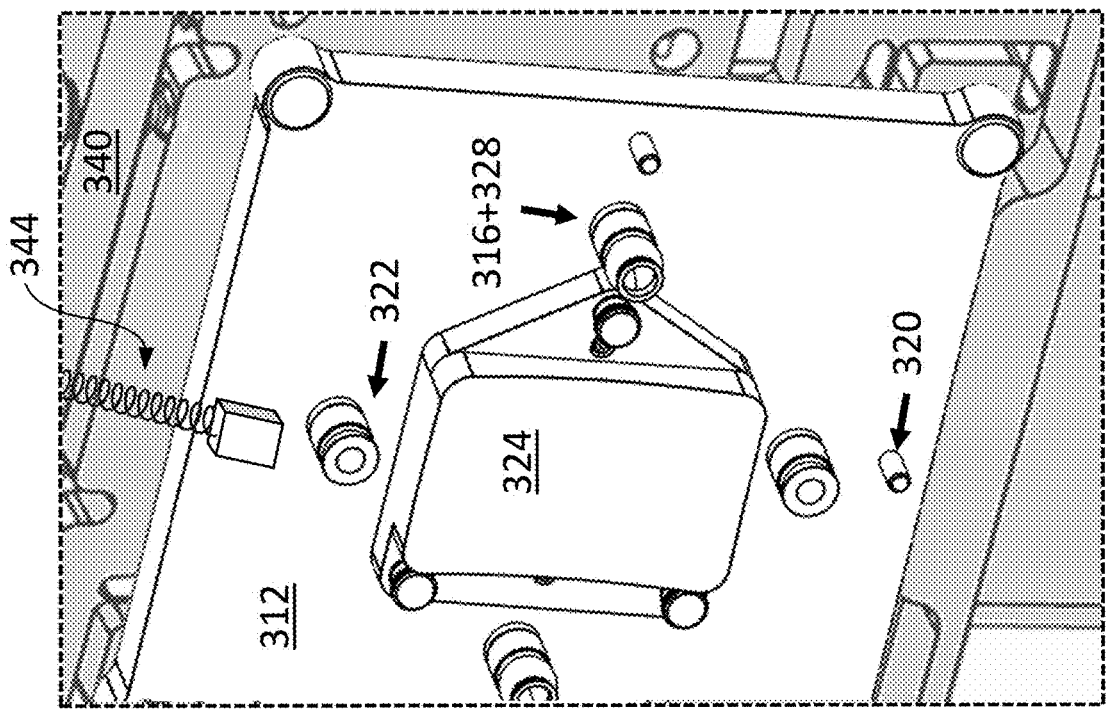
Figure 9A:
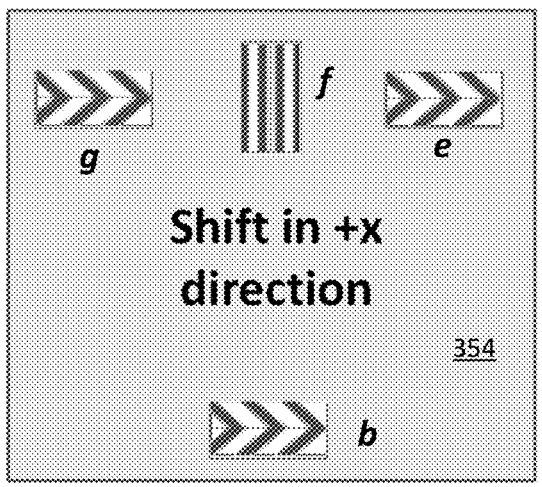
Figure 9D:
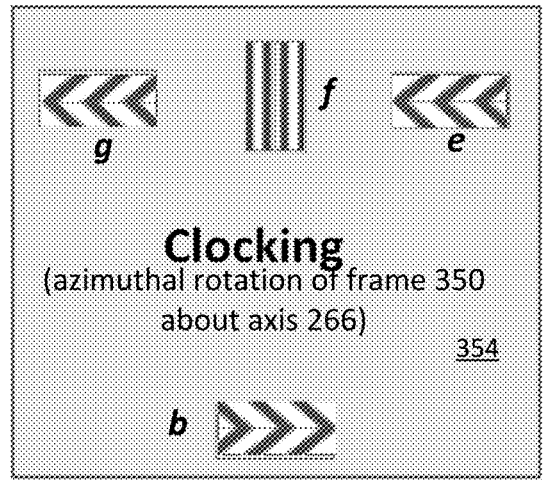
Figure 9B:
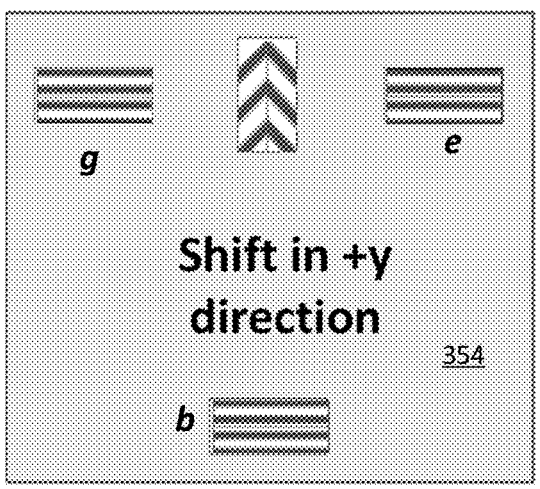
Figure 9C:
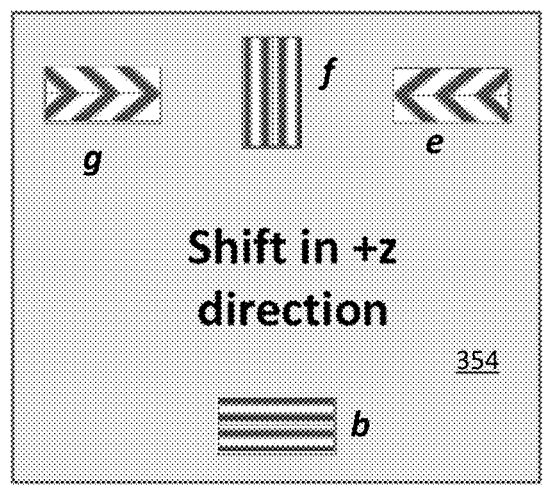

FIGS. 3A, 3B, and 3C provide illustrations to portions of one non-limiting embodiment of the optical measurement system 200. FIG. 3A illustrates a metrology platform 300 combining an embodiment 302 of the metrology frame 250 of FIGS. 2A, 2B and an embodiment 304 of the optical system 228 of FIGS. 2A, 2B.

The embodiment 302 of the metrology frame is shown to include at least a carriage 308 that includes a housing base 312 and at least one retroreflector holder 316 affixed to the housing base 312. (In the specific example of FIG. 3A shown are two retroreflector holders, shown disposed in a diametrically opposing fashion with respect to the central area of the housing base 312. As will be understood from the discussion below, the presence of more than one of the retroreflectors held in such multiple retroreflector holders 316—positions of which are defined at different azimuthal angles in the plane of the housing base 312—allows the user of the metrology frame to "clock"/regulate the rotation of the metrology frame about the optical axis and therefore precisely define the angular deviation of a reference point at the metrology frame 302 with respect to alignment beams of light arriving to such retroreflectors from the optical system and/or with respect to the optical axis 266. Generally, there is no requirement that multiple retroreflector holders and, therefore, multiple retroreflector structures held by such holders—when present—be necessarily distributed at equally-spaced angular positions in the azimuthal plane, which is the xy-plane of the local system of coordinates). The plane of the metrology frame is substantially transverse to the z-axis (representing the optical axis 266 of the system 200 in the local system of coordinates).

The housing base 324 contains a set of precisely dimensioned and spatially located fiducial references or structures 320 (shown are four of such fiducial structures; in at least one implementation, the fiducial structures may be shaped as precisely-dimensioned pins, as shown—although any other reference structure, for example a step or a rib or a notch may be used if and when appropriate). The term "set" as used in this disclosure in reference to an identified object is defined as a collection including one or more of such objects. The housing base is further dimensioned to receive and removably hold thereat an optical workpiece 324 such that at least one of a spatial position and a spatial orientation of a chosen reference point of the optical workpiece is maintained in the same pre-defined dimensional relationship with respect to the set of fiducial structures 320 substantially regardless of how many times the given workpiece is attached to or taken off the housing base.

The retroreflector holder 316 is judiciously structured to receive and removably hold a respectively-corresponding optical retroreflector structure (one specific and non-limiting version of which is shown as 328 in FIG. 3A and in FIG. 3C) such that at least one of a spatial position and a spatial orientation of a chosen reference point of the such optical retroreflector structure is also in a respectively-corresponding pre-defined dimensional relationship with respect to the set of fiducial structures 320. The specific embodiment of the retroreflector structure 328, shown in FIG. 3C separated into its constituent components, includes a sphere-mounted (and, preferably, corner-cube) retroreflector (SMR) 332 and a generally optional collar holder 336 dimensioned to support the corresponding optical retroreflector. The non-limiting example of the embodiment of the collar holder 336 is shown to be structured to include a precisely-dimensioned foot 336A (in one case—a cylindrical foot, a rod, although different cross-sectional shapes can be employed) and a precision-dimensioned shoulder plate (or stacked plates) 336B preferably transversely attached to end of the foot 336A.

Understandably, in a situation when the collar holder 336 is not employed, the retroreflector holder 316 may be appropriately shaped to directly accommodate to directly receive and fixate, removably, the retroreflector (in the case of SMR 332, the retroreflector holder may have a surface that is substantially congruent with the outer surface of the SMR 332, thereby having the holder 316 to have a concave shape). The axis of the retroreflector holder 316 that is perpendicular to the surface of the housing base 312 is defined to be at predetermined distance(s) with respect to each and every of the fiducial structures 320. When the collar holder 336 is used, the retroreflector holder 316 may be configured such as to fittingly accept the foot 336A. The shoulder plate or plates 336B necessarily has/have precisely defined thickness(es) such that, when the foot 336A is substantially fully inserted into a respectively-corresponding hole of the retroreflector holder 316 to have the plate(s) 336B is in contact with a surface of the retroreflection holder 316, not only the distance between an outer surface 336C (facing the retroreflector of the shoulder plate 336B and the surface of the holder 316 is precisely and reliably and repeatably defined but also the separation between the axis (not shown) of the foot 336B and a given fiducial reference structure 320 is precisely and reliably and repeatably defined. In at least one embodiment, the housing base 312 may be additionally equipped with at least one of the substantially planar optically-reflecting elements 322 (such as conventional substantially matte screen elements, on the backgrounds of which a spot of light can be easily visually perceived; shown are two of such elements, disposed diametrically opposed to one another with respect to the central portion of the carriage 312 that, as shown, already carries the workpiece 324).

When and if there is a need to spatially manipulate the carrier 308 that has been positioned in the optical measurement system (with all elements or structures or components juxtaposed with such carrier), the metrology frame 302 may be structured to additionally include a support base (shown as 340) that is dimensioned to receive the carriage 308 attached to the support base such that the retroreflector holder(s) 316 and the set of fiduciary structures 320 are separated from the support base 340 by the housing base and to movingly/translationally support the carriage 308. For the purposes of translational and/or angular repositioning of the carriage 308 with respect to the support base 340, at least one bearing 344 can be used (the bearing(s) 344 are then cooperated with at least one of the carriage and the support base and configured to moveably change a least one of a mutual position and a mutual orientation of the support base and the carriage, thereby enabling a translation of the carriage in a plane of the support base 340 and/or tilting the carriage with respect to the support base 340). In the specific and non-limiting example of FIG. 3A, the numeral 344 denotes to a spring loading the bearing structured as a micropositioner employed to translationally move the housing base 312 in a plane parallel to the plane of the support base 340.

The embodiment 304 of the optical system includes an optically-transparent substrate 354, which is generally removably and translationally contained in a frame of the substrate holder 350. The substrate holder 350 is equipped with at least one substrate holder bearing 358 enabling linear and/or angular translation of the substrate holder frame with the optically-transparent substrate 354 within the substrate holder 350. The substrate 354 contains a hologram (or a group of holograms) that has multiple spatially distinct from one another holographic regions (outlined in FIG. 3A schematically with rectangular and/or circular boundaries within the perimeter of the substrate 354, and labelled as a, b, c . . . ). A plurality of various optical wavefronts formed by various regions of the hologram of the optical system 304 in transmission of light 262, which arrives in operation of the measurement system from the wavefront sensor 210 towards the substrate 354, is aggregately denoted as 358 (and corresponds to the optical wavefront of the schematic beam 230 of FIG. 2).

According to the idea of the invention, among the multiplicity of the holographic regions a,b,c . . . g . . . etc of the system 304 there is at least one holographic region (and, in practice, preferably multiple regions) structured to form, in transmission, corresponding spatially converging optical beams/wavefront(s) (see 358) directed towards the metrology platform when such region(s) is/are irradiated with the input beam of light, here 262. Among such holographic regions there may a holographic region configured to form a corresponding first spatially converging towards the metrology frame 302 optical wavefront that defines a first focus (in one specific case, such first focus may be a line focus substantially aligned with a first axis in a plane of the optically-transparent substrate 350 or in a plane of the housing base 312; or as a focal distribution of light shaped as a ring for example an elliptically-shaped ring). Additionally or alternatively, there may be a holographic region configured to form a corresponding second spatially converging optical wavefront that defines a second focus (in a specific case, such second focus can also be dimensioned as a line focus—this one aligned with a second axis in the plane of the optically-transparent substrate 350 or the plane of the housing base 312; or as a focal distribution of light shaped as a ring for example an elliptically-shaped ring). When these formed foci are linear foci, the second axis is chosen to be transverse—and, preferably, substantially perpendicular—to the first axis. The optical wavefronts produced by these holographic regions, as is discussed below, may be used for optical alignment of the metrology frame 302 with respect to the source of light (here, the source of light of the wavefront sensor 210). Furthermore, there may be present an additional holographic region forming an optical front directed towards the metrology frame 302 and used for measurement/profiling of the workpiece 324 (when such workpiece is secured in the metrology frame 302). Additionally, in at least one case there may optionally be present a holographic region configured to form, in reflection, when irradiated with the light from the beam 262, an optical wavefront returned by the substrate 350 back to the wavefront sensor 210. Such optical wavefront may be used for alignment of the substrate 350 (and, therefore, the hologram of this substrate, with respect to the optical wavefront generated by the wavefront sensor 210.

Re-Configuring Lights Beams Converging onto the Metrology Frame to Increase Quality of Alignment.

The practical use of a metrology frame equipped with a retroreflector—and, in particular, with a CCR as discussed above—while solving the complexity of optical alignment methodologies presented in US 2021/0361159 may arguably be considered, nevertheless, to possess specific limitations stemming from the fact that most CCRs employ corner-cube prisms that lack ideal sham inner corners and/or edges. When a given corner cube is nearly aligned with respect to the spatial converging beam of light (238 in FIGS. 2A, 2B; 358 in FIG. 3A) directed towards such CCR, as discussed above, practically all the light is focused at the apex V where all the imperfect edges of the constituent mirror of the CCR intersect. As a result, the optical wavefront reflected by the practical CCR back towards the wavefront sensor (interferometer, in one case) is greatly degraded by the imperfect corners and/or vertex, making the measurement/alignment at a minimum difficult and in some situations unreliable. The embodiment of the present idea provides a solution for this additional problem as well. According to one implementation of the idea of the invention, the converging beam of light 230, 358 delivered to the retroreflector (CCR) may be configured to possess a substantially cylindrical—rather that spherical—wavefront, thereby forming a line focus upon substantially completer convergence.

In terms of schematic illustrations of FIGS. 2A, 2B, 3A and referring to the schematic of FIG. 4A it means that the optical wavefront of the beam 230, 358 delivered to the retroreflector (of the retroreflector structures 260, 274, 328) is focused by for example, a specific holographic region 408 of the portion of the optical system 228, 354 only in one direction, say along the local x-axis, to come to focus while maintaining this beam of light substantially collimated in the other, transverse direction (along the y-axis, in this example). As a result, instead of focusing to a point at the vertex of the CCR 260A, 274A, the incident beam of light 230, 358 is focused into a line 410 extended, in this example, along the y-axis. The so-shaped wavefront is substantially not tilted, along the y-axis, with respect to the axis of the beam 230, 358. (Accordingly, once the CCR of the structure 260, 274, 328 has been aligned with respect to the beam 230, 358 such that the axis of this beam and the axis of symmetry of the CCR substantially coincide, the optical wavefront of the beam 230, 358 viewed along the y-axis is substantially flat and perpendicular to the axis of symmetry of the used CCR). FIG. 4B illustrates the situation when different holographic regions 408A, 408B of the available hologram (in one non-limiting case, in the hologram embodied in the substrate 354 of the implementation of the system presented in FIG. 3A) are configured to form multiple non-spherical (preferably—cylindrical) wavefronts 412A, 412B that converge light incident from the wavefront sensor in the direction of a corresponding retroreflector and onto such holographic regions into multiple (and optionally—differently spatially oriented) respectively corresponding focal lines 410A, 410B The consequence of so-shaping the incident optical wavefront 230, 358 with the use of, for example, a portion of the hologram of the optical system 228, 304 or with another hologram or optical element used for this purpose is that when—as a result of the alignment of the CCR of the metrology frame 250, 302 with respect to such incident beam of light 230, 358—the vertex of the conventional, imperfect CCR is made substantially coincide with the focal line of the beam 230, 358, only a portion or subset of the focal distribution of light (and not all of distribution of light at the focus) is frustrated by the imperfect corners/edges of the CCR. Furthermore, the use of the focal light distribution that differs from the point focus—and, in the specific case, the use of a line focus—allows the user to accomplish the alignment of the metrology platform 250, 302 that is equipped with the retroreflector (and, in particular, with the CCR, optionally configured as the SMR) with surprising and advantageous (over the existing in related art systems) ease.

In a related non-limiting implementation, at least one of the holographic regions of patches of the used hologram (for example, of a hologram of the system 228, 304) can be judiciously configured to generate such spatially-converging non-spherical beam that is directed towards the corresponding retroreflector (for example—the SMR 332) in which the optical wavefront, in addition to being non-spherical (and, preferably, cylindrical), is also characterized by a small (for example, only half-a-wave) but predetermined tilt with respect to the axis of the corresponding beam, in only one direction (y- or x-). Generally, such spatially-converging cylindrical wavefront is configured to possess such tilt that is non-uniformly distributed across the wavefront and, in a specific implementation, such optical wavefront is configured to include a tilt that is symmetric with respect to the axis of the beam (this tilt may be referred to as a V-shaped tilt). In this case, a first sign of a first tilt in a first portion of the cylindrical optical wavefront as defined on one side of an auxiliary axis, which is substantially perpendicular to both the axis of rotation of the CCR of the SMR 332 and the axis of the beam, is opposite to a second sign of a second tilt in a second portion of such optical wavefront defined on another side of the auxiliary axis.) The practical use of configuring the corresponding holographic patch of the system 228, 304 to generate such an optical wavefront—as well as the practical use of employing such an optical wavefront for the purposes of aligning the target optical workpiece with the use of the CCR mechanically coupled with such optical workpiece, according to the idea of the invention—will become apparent to the skilled artisan once the image formed at the image plane produced in this case as a result of acquisition of light from such beam reflected from the CCR and corresponding to the "null" alignment between the corresponding beam 358 and the CCR, is analyzed. Such optical image (not shown) contains interferometric fringes caused exclusively and only by the above-identified tilt introduced to the otherwise substantially cylindrical shape of the optical wavefront of the beam 358. This wavefront-specific tilt fringes (appearing in a Chevron-type pattern) can now be used to recognize a direction (and determine the amount) of the lateral shift between the axis of rotational symmetry of the CCR of the metrology frame 302 and the axis of the corresponding beam 358 incident onto this CCR. Indeed, once such lateral shift is present (that is, the "null" alignment is no more as it is frustrated in the direction transverse to the axis of the beam 358), the wavefront-specific tilt fringes change their angular orientation in the output image thereby resulting in a transformed image in which the magnitude of the angle α of the inclination of the fringes depends on the amount of the lateral shift in question. Accordingly, the produced asymmetry of the output image serves as an indication of the lateral misalignment between the CCR and the incident (measurement) beam of light produced by the interferometer-based optical measurement system containing the CGH.

Some Elements of Alignment Procedure

FIGS. 5A, 5B provide schematic illustration to the use of a retroreflector that may be juxtaposed with the metrology frame 302 (such as the SMR 332) and that is used for the mutual lateral alignment with respect to the converging upon it generally-non-spherical optical wave front. Shown is the non-limiting example utilizing the retroreflector 332, which may be juxtaposed with the metrology frame and used for the lateral alignment of the carriage of the metrology frame (with all components carried by such carriage including an optical workpiece) with respect to the beam 358 configured to form a line focus 510 (or 410, 410A, 410B). As shown, the vertex of the CCR of the SMR 332 is displaced laterally and/or longitudinally with respect to the location of the line focus. As a person of ordinary skill having the advantage of this disclosure will readily understand, lateral displacement between the vertex of the SMR 332 and the line focus 510 is compensated/corrected by (i) assessing a portion of the interferometric image, at the imaging plane of the overall optical measurement system, that corresponds to the interference of the appropriate beam 358 incident onto and reflected by the SMR 332 and the reference beam of the optical measurement system, and (ii) appropriate transverse repositioning of the carriage 308 with the use of the bearing(s) 344 of the frame 304 to make the interferometric fringes of this portion of the image representing this lateral displacement as few as possible and substantially parallel to one another.

When the line is focused exactly on the retroreflector's vertex, the reflected light returns to the CGH and creates a null fringe. If the retroreflection is shifted by, for example, Δ in the direction perpendicular to the line focus, tilt fringes are seen in the interferometer with the amount $N=2\Delta/(\lambda \cdot FN)$, where N is the number of fringes at wavelength λ across the CGH and the f-number FN is the ratio of the distance separating the line focus from the corresponding hologram patch at 354 to the size of the such patch.

FIGS. 6A, 6B, 6C, and 6D illustrate interferometric images empirically-obtained interferometric through the sequence of steps leading to the reduction of the lateral (transverse) displacement—in this case, along the single chosen axis of the local system of coordinates—under the geometric conditions identified in FIGS. 6A-6D. Specifically, the holographic region of the hologram in the substrate 354 used to produce the focused beam 358 with an F-number of f/20 incident onto the SMR 332 had a spatial dimension of 15 mm, while the longitudinal separation between the vertex of the SMR 332 and this holographic was about 300 mm. Understandably, the transverse alignment of the carriage 308 (with the SMR 332) along the other two axes (in this case, the y-axis and the z-axis) is performed in the similar fashion.

FIG. 7 is an optical image, formed at the plane 270, displaying different portions of the optical field of the substrate 354 (including those corresponding to different holographic region of the hologram contained in the substrate 354) together with the interferograms caused by the portions of the wavefront delivered from the wavefront sensor 210 that have been transmitted through such different portions and returned by the correspondingly-irradiated elements of the metrology frame 302 (including multiple retroreflectors). The portion of the image corresponding to the holographic region e can be seen to display the characteristic "Chevron" type of interferometric fringes formed as disclosed above.

Referring now to schematics of FIGS. 8A, 8B, and 9A, 9B, 9C, and 9D, judicious design of the various holographic regions or patches (such as for example patches b, e, d, and f as shown) of the hologram of the system 304 allows the user to implement a situation in which multiple line foci of the corresponding portions of the beam 262 (that are transformed by these hologram patches into various beams 358 directed towards different optical elements affixed to the carriage 308, see FIG. 3A) are used for alignment of the plane of the carriage by indicating not only the degree of a chosen misalignment but also a direction in which the carriage should be moved to correct such misalignment. Maintaining the interferometric fringes of the corresponding portion of the image at the plane 270 parallel to one another is indicative of maintaining the corresponding misalignment substantially compensated. The optional but preferred use of multiple retroreflector structures 328 associated with the metrology frame 304 now becomes apparent: the angular separation of the two or more of the retroreflector structures 328 in the plane of the carriage 308 (as shown in FIG. 3A) allows the user to assess two or more interferometric images at the plane 270—each representing the reflection of light off the respectively corresponding structure 316—to "clock" the azimuthal orientation of the carriage 308 and, accordingly, vary the angular orientation of the carriage 308 (as well as the workpiece 324 when the workpiece is attached to the carriage 308) with respect to the optical axis 266.

Figure 10:
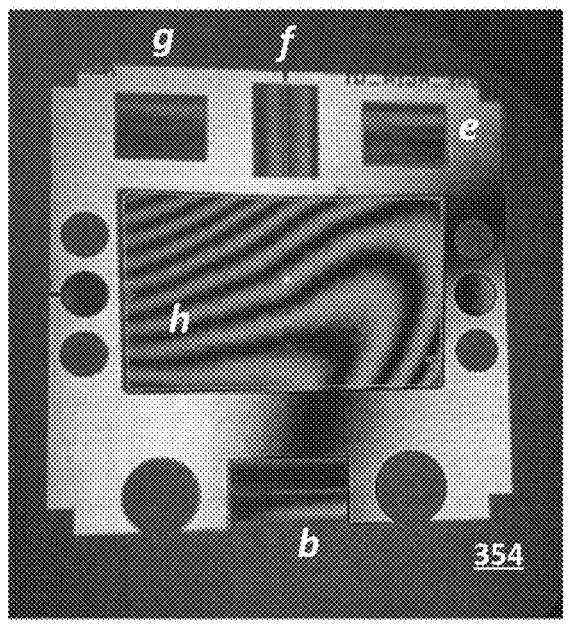
FIG. 10 illustrates the image representing results of the measurement of the target workpiece after the substantial alignment between a portion of the optical measurement system carrying the workpiece and the elements forming the alignment beams (here—the holographic regions of the identified portion of the optical measurement system) has been achieved.

FIG. 10 provides portion h, of the overall an image, representing the results of the measurement/profiling of a target workpiece (in reference to the embodiment depicted in FIG. 3A, for example—the workpiece 324, see FIG. 3A) after the alignment between the holographic regions forming non-spherical (e.g. cylindrical) converging wavefronts and the respectively corresponding retroreflectors (in reference to the embodiment of FIG. 3A—retroreflectors of the retroreflector structures 328) has been achieved such that at least one (and preferably all, as evidenced by the portions of the image corresponding to the holographic patches b, e, f g) of spatial tilt, azimuthal angular deviation, transverse shift, and longitudinal shift between the retroreflectors and the corresponding converging beams has/have been substantially compensated for/removed/nullified.

Processes of acquiring optical data characterizing surfaces and/or objects with the use of wavefront sensors in general and with interferometric systems in particular and methods of processing these data to extract information about the surfaces and/or 3D shapes of the object (for example, processes of assessing a spatial profile of the optical workpiece from a target interferometric optical image formed with the use of a portion of an input beam of light that has been reflected by optical workpiece) are well known in related art, and for that reason not discussed here in any details. The reader is referred to, for example, a) "Optical Shop Testing", $3^{rd}$ edition, Daniel Malacara (Editor), ISBN 978-0-471-48404-2 Jun. 2007; b) "Field Guide to Interferometric Optical Testing", by Eric P. Goodwin and James C. Wyant, 2006, available at https://doi.org/10.1117/3.702897 or as pdf ISBN: 9780819478252 or in print ISBN: 9780819465108; and c) www.zygo.com/products/metrology-systems/laser-interferometers/verifire, to name just a few.

Notably, the use of a Cat's eye retroreflector in the proposed methodology does not have shortcomings caused by the presence of "corners and/or edges" in a CCR—as the Cat's eye retroreflector does not have such corners/edges: the Cat's retroreflector can be used in an embodiment of the invention that utilizes more conventional, conically-focused incident beams of light to align the metrology platform and/or measure the optical workpiece along both the x-axis and the y-axis simultaneously.

A skilled artisan now appreciates that some examples of preferred use of embodiments of the invention that were implemented, but not necessarily discussed in detail, included the following:

The employed non-spherical (and, in particular—cylindrical) wavefront was created using diffraction of light from a computer generated hologram, CGH;

The light used for alignment and measurement(s) was the 1632.8 nm light generated by a continuous wave (CW) laser A retroreflector was configured to contain a corner cube retroreflector;

The corner-cube retroreflector was mounted into a spherical ball-like shell with the center of curvature of such shell being substantially coincident with the retroreflector's vertex, thereby forming what is known to be a sphere-mounted retroreflector (SMR);

A set of SMRs was held mechanically in positions precisely-defined with respect to datum (fiducial) features associated with an object, thereby uniquely defining position and/or orientation of an object or workpiece in space with respect to the SMRs;

The object or workpiece was configured as an optical element with an aspherical optical surface, thereby enabling the system to measure/spatially profile the aspherical optical surface based on the defined position of the object in space;

The light reflected by the SMRs was captured by the wavefront sensor, and the information was used to determine the positions on the SMRs with respect to the hologram that generated the non-spherical optical wavefront.

The information/data representing the positions of the SMRs was used to move the object to have it appropriately aligned with respect to the hologram (in other words, to ensure the correct position and/or orientation of the object with respect to the hologram;

The same hologram that was employed to create the cylindrical wavefronts was also employed to create a wavefront used to measure/profile the shape of the object;

In at least one specific case, the used wavefront sensor was configured as a phase shifting interferometer;

While implementing any of the above, a non-zero-extent free space region was maintained between the hologram and the combination of (SMRs+object).

It is appreciated that, among other results, embodiments of the invention provide a method for using a corner-cube reflector (CCR) secured at a housing structure, which method includes at least the steps of (a) irradiating CCR with a first optical wavefront delivered from a wavefront sensor and having a first axis and directed at an apex of the CCR while the housing structure is connected to an optical workpiece; (b) forming an optical image based on at least in part on acquisition of the first optical wavefront reflected by said CCR; and (c) spatially aligning a combination of the CCR with the optical workpiece while not changing mutual orientation and connection between the CCR and the optical workpiece to eliminate at least one of spatial tilt, azimuthal angular deviation, transverse shift, and longitudinal shift of the optical workpiece with respect to the first axis. At least one implementation of the method, the housing structure may include a spherical shell that is in direct contact with either a surface of the optical workpiece or with a reference structural feature of a mounting unit in which the optical workpiece is affixed (such that a center of the spherical shell substantially coinciding with the apex of the CCR) and/or the step of forming an optical image includes forming the optical image representing a spatial misalignment of the first axis with respect to a second axis, the second axis being an axis of the CCR. Alternatively or in addition, the housing structure may include a rod, while the method includes a step of maintaining the rod being inserted in an opening formed in a mounting unit, in which the optical workpiece is affixed, during both the step of irradiating and the step of spatially aligning. Alternatively or in addition, and substantially in every implementation of the method, the opening formed in the mounting unit may define a cylindrical aperture and the rod may have an outer cylindrical surface. Alternatively or in addition—and substantially in any implementation of the method—at least one of the following conditions may be satisfied: (i) the step of irradiating may include irradiating the CCR with the first optical wavefront substantially focused on the apex of the CCR; (ii) the step of irradiating may include irradiating the CCR with the first optical wavefront that is a substantially cylindrical spatially converging wavefront; and (iii) the step of irradiating may include irradiating the CCR with the first optical wavefront that is a substantially cylindrical wavefront that possesses a tilt with respect to a direction of propagation thereof. In at least one specific case, the step of forming the optical image may include repositioning the combination of the CCR with the optical workpiece along the second axis and/or an axis transverse to the second axis until the only interferometric fringes remaining in the optical image are fringes caused by a tilt between the first and second axes. In at least one embodiment, the step of irradiating may include irradiating the CCR with the first optical wavefront that is a substantially cylindrical optical wavefront focused on the apex of the CCR, an axis of rotation of the substantially cylindrical surface of the first optical wavefront coinciding with a third axis that is transverse to the second axis. Alternatively or in addition, and in at least one implementation of the method, at least one of the following conditions is satisfied: (a) the method includes transmitting a beam of light with pre-determined characteristics through a hologram to form the first optical wavefront; and (b) the employed wavefront sensor is an interferometer.

Embodiments of the invention also provide an optical system that include a housing unit; a CCR having a first axis and secured in the housing unit (here, the first axis is an axis of a 3-fold symmetry of the CCR; and a structural protrusion connected to and connected to a body of the housing unit and extending therefrom along a second axis of the structural protrusion, the second axis and the first axis substantially coinciding with one another. Additionally, the optical system may include a shoulder element directly connected to a body of the housing unit and separating the structural protrusion from the body of the housing unit, and/or an optical wavefront sensor configured to generate an output beam of light directed to the housing unit. In at least one embodiment, the optical system contains a hologram configured to transform an optical wavefront incident thereon into a transmitted substantially cylindrical optical wavefront (with such hologram disposed transversely with respect to the first axis, the hologram and the CCR being spatially coordinated such as to have the substantially cylindrical optical wavefront converge towards the CCR); or a hologram configured to transform an optical wavefront incident thereon into a transmitted substantially spherical optical wavefront (with such hologram disposed transversely with respect to the first axis, the hologram and the CCR being spatially coordinated such as to have the substantially cylindrical optical wavefront converge towards the CCR). Alternatively or in addition, and in at least one implementation, (i) the optical system may include a first optical workpiece removably affixed to the housing unit in a predetermined spatial relationship with respect to an apex of the CCR; and/or (ii) the optical system may include the first optical workpiece that contains a first opening dimensioned to accommodate the structural protrusion therein to affix the CCR to the optical workpiece. Alternatively or in addition, and in at least one embodiment, the optical system may additionally include a second CCR disposed in the housing unit spatially-separately from both the first CCR and an axis of the housing unit.

Embodiments of the invention further provide a method for aligning a surface of an optical component with respect to a first beam of light delivered from an optical system containing an interferometer and equipped with an CGH. Such method includes (i) positioning the surface of the optical component, mechanically and in a spatially-fixed relationship coupled to a housing that contains at least one retroreflector, transversely to the beam of light such that an apex of the at least one retroreflector is irradiated with the first beam of light; (ii) repositioning a combination of the optical component and the housing with the at least one retroreflector along the beam of light while maintaining said spatially-fixed relationship unchanged to form an optical image of the apex at an output of the interferometer; (iii) while maintaining this spatially-filed relationship unchanged, performing at least one of: (iii.a) rotating of the combination about an axis of symmetry of the at least one retroreflector, and (iii.b) tilting the combination in a plane containing said axis of symmetry and an axis of the first beam of light, to either orient interferometric fringes of the optical image in a pre-determined fashion or substantially remove the interferometric fringes from the image. In a specific embodiment, the method may additionally include a step of generating the first beam of light at the CGH disposed between the interferometer of the optical system and the optical component; and/or the step of generating a second beam of light at the CGH to be directed to and irradiate the apex contemporaneously with the step of generating the first beam of light. In at least one implementation, the first beam of light is configured to be spatially converging to have a focal plane of the first beam to be substantially at the apex; wherein in at least one case the first beam of light may have a substantially cylindrical wavefront. The method may additionally include a step of repositioning the combination in a plane transverse to the axis of the first beam of light to position the surface of the optical component across the first beam light and, optionally, a step of determining at least one of spatial characteristics and material characteristics of the optical component based at least in part on an interferogram formed at the output of the interferometer as a result acquiring, by the interferometer, light from the first beam of light after the first beam of light interacted with the optical component.

A person of ordinary skill in the art will readily appreciate that references throughout this specification to "one embodiment," "an embodiment," "a related embodiment," or similar language mean that a particular feature, structure, or characteristic described in connection with the referred to "embodiment" is included in at least one embodiment of the present invention. Thus, appearances of the phrases "in one embodiment," "in an embodiment," and similar language throughout this specification may, but do not necessarily, all refer to the same embodiment. Accordingly—as the skilled artisan will readily appreciate—while in this specification the embodiments have been described in a way that enables a clear and concise specification to be written, it is intended that substantially none of the described embodiments can be employed only by itself to the exclusion of other embodiments (to the effect of practically restriction of some embodiments at the expense of other embodiments), and that substantially any of the described embodiments may be variously combined or separated to form different embodiments without parting from the scope of the invention.

Features of the specific implementation(s) of the idea of the invention have been described with reference to corresponding drawings, in which like numbers represent the same or similar elements wherever possible. In the drawings, the depicted structural elements are generally not to scale. No single drawing is intended to support a complete description of all features of the invention. In other words, a given drawing is generally descriptive of only some, and generally not all, features of the invention. A given drawing and an associated portion of the disclosure containing a description referencing such drawing do not, generally, contain all elements of a particular view or all features that can be presented is this view, for purposes of simplifying the given drawing and discussion, and to direct the discussion to particular elements that are featured in this drawing. A skilled artisan will recognize that the invention may possibly be practiced without one or more of the specific features, elements, components, structures, details, or characteristics, or with the use of other methods, components, materials, and so forth. Therefore, although a particular detail of an embodiment of the invention may not be necessarily shown in each and every drawing describing such embodiment, the presence of this detail in the drawing may be implied unless the context of the description requires otherwise. In other instances, well known structures, details, materials, or operations may be not shown in a given drawing or described in detail to avoid obscuring aspects of an embodiment of the invention that are being discussed.

For the purposes of this disclosure and the appended claims, the expression of the type "element A and/or element B" has the meaning that covers embodiments having element A alone, element B alone, or elements A and B taken together and, as such, is intended to be equivalent to "at least one of element A and element B". The term "image" generally refers to an ordered representation of detector output corresponding to spatial positions. For example, a visual image may be formed, in response to a pattern of light detected by an optical detector, on a display device such as a video screen or printer.

Embodiments of the invention have been described as preferably including a (micro)processor—in one case, a computer processor-controlled by instructions stored in memory. The memory may be random access memory (RAM), read-only memory (ROM), flash memory or any other memory, or combination thereof, suitable for storing control software or other instructions and data. Those skilled in the art should also readily appreciate that instructions or programs defining the functions of the present invention may be delivered to a processor in many forms, including, but not limited to, information permanently stored on non-writable storage media (e.g. read-only memory devices within a computer, such as ROM, or devices readable by a computer I/O attachment, such as CD-ROM or DVD disks), information alterably stored on writable storage media (e.g. floppy disks, removable flash memory and hard drives) or information conveyed to a computer through communication media, including wired or wireless computer networks. In addition, while the invention may be embodied in software, the functions necessary to implement the invention may optionally or alternatively be embodied in part or in whole using firmware and/or hardware components, such as combinatorial logic, Application Specific Integrated Circuits (ASICs), Field-Programmable Gate Arrays (FPGAs) or other hardware or some combination of hardware, software and/or firmware components.

For the purposes of this disclosure and the appended claims, the use of the terms "substantially", "approximately", "about" and similar terms in reference to a descriptor of a value, element, property or characteristic at hand is intended to emphasize that the value, element, property, or characteristic referred to, while not necessarily being exactly as stated, would nevertheless be considered, for practical purposes, as stated by a person of skill in the art. These terms, as applied to a specified characteristic or quality descriptor means "mostly", "mainly", "considerably", "by and large", "essentially", "to great or significant extent", "largely but not necessarily wholly the same" such as to reasonably denote language of approximation and describe the specified characteristic or descriptor so that its scope would be understood by a person of ordinary skill in the art. In one specific case, the terms "approximately", "substantially", and "about", when used in reference to a numerical value, represent a range of plus or minus 20% with respect to the specified value, more preferably plus or minus 10%, even more preferably plus or minus 5%, most preferably plus or minus 2% with respect to the specified value. As a non-limiting example, two values being "substantially equal" to one another implies that the difference between the two values may be within the range of +/−20% of the value itself, preferably within the +/−10% range of the value itself, more preferably within the range of +/−5% of the value itself, and even more preferably within the range of +/−2% or less of the value itself.

The use of these terms in describing a chosen characteristic or concept neither implies nor provides any basis for indefiniteness and for adding a numerical limitation to the specified characteristic or descriptor. As understood by a skilled artisan, the practical deviation of the exact value or characteristic of such value, element, or property from that stated falls and may vary within a numerical range defined by an experimental measurement error that is typical when using a measurement method accepted in the art for such purposes.

Disclosed aspects of the invention, or portions of these aspects, may be combined in ways not necessarily listed above and may be appropriately varied without substantial change of the scope of the invention. For example, in at least one embodiment, the wavefront sensor used in the optical measurement system can be configured with the use of a Shack-Hartmann interferometer. Alternatively or in addition, and in at least one embodiment the optical vertex of the retroreflector, used as part of the embodiment of the metrology frame, can be disposed at an axis of a cylindrical surface. Alternatively or in addition, in at least one implementation the optical measurement system can be configured as a dedicated optical alignment instrument such as an alignment telescope, a theodolite, an autocollimator, or an point source microscope. Alternatively or in addition, the hologram of the system 304 of FIG. 3A may be configured such as to generate multiple optical wavefronts directed to the same retroreflector of the metrology frame 302 to implement a redundant measurement use for self-referencing calibration of the metrology frame. Alternatively or in addition, at least one fiducial reference from the set of fiducial references may be defined on the optical piece itself. In at least one related implementation of the idea of the invention, the metrology platform of the invention is configured such as to constrain fewer than six degrees of freedom of the retroreflector and/or optical workpiece with respect to the incoming beam of light, allowing at least one of the degrees of freedom to be adjusted independently. In at least one implementation, the optical measurement system can be structured in such a way as to transmit light, incident onto the optical workpiece, through the workpiece and perform the measurement of the spatial profile and/or distribution of refractive index of the workpiece in transmission. In at least one embodiment, among the structural references and/or fiducial structures of the metrology frame, in at least one implementation tooling balls may be employed Furthermore, some of the related embodiments of the invention, which are intended to be within the scope of the present invention, may employ various combinations of the following:

(1) The use of a general diffractive optical element and/or a refractive optical element and/or a reflective optical element to generate a non-spherical (preferably, a cylindrical) wavefront for determination of a position and/or orientation of the retroreflector as discussed above.

(2) Forming and using a non-spherical converging (preferably, a cylindrical) wavefront at least one of a phase distribution, and amplitude distribution, and a polarization distribution of which is varied and/or modulated. (A specific example of such variation was discussed above, where a V-tilt was added to the cylindrical wavefront delivered to the retroreflector, thereby enabling a determination of a direction of a given misalignment of the retroreflector based on "Chevron" shaped interferometric fringes in an interferometric image formed when the used wavefront sensor was configured as an interferometer system).

(3) Forming and using a non-spherical converging wavefront that forms a focus preferentially extended on one direction. (While the departure from a purely cylindrical wavefront may cause certain shortcoming in the use of the wavefront, such shortcomings can be overcome with the appropriate compensation in the used optics or the wavefront sensor.) Examples of such related embodiments include formation and use of a conically-shaped optical wavefront (for example, with the use of an axicon to have such conically-shaped optical wavefront be substantially symmetric with respect to the axis and its line focus be extended along the axis); formation and use of substantially cylindrical wavefront with added power (with a corresponding line focus often referred to as an astigmatism); the formation and use of a converging optical wavefront that is focused in a generally curved-in-space line (and, in a specific case, the curve line that is closed upon itself, thereby defining a ring focus).

(4) The use of at least one retroreflector that employs
  a. A set of three reflective surfaces positioned at 90° from each other to form "a corner";
  b. A corner-cube prism, effectuating the 3 reflections of light inside the body of the prism from optical surfaces arranged as a 90-degree-corner.
  c. A "cat's eye retroreflector", utilizing a spherical refractor that focuses light onto its reflective rear surface.
  d. A compound catseye retroreflector that possibly uses several surfaces and refractive materials to serve the same purpose.
  e. A device that utilizes the non-linear optical phenomenon of phase conjugation to generate a retroreflected light.

(5) The use of 2 mirrors arranged as a 90° optical roof, as an alternative to a retroreflector. In this embodiment:
  i. Rather than measuring the deviation of the line focus of the incoming converging wavefront in two directions (as is done in the case of the retroreflector), the 90-degree optical roof may be used to measure a deviation of a position of the line focus along one axis and an angular deviation of the lines focus— along another axis.
  ii. Unlike in the embodiment that employs a retroreflector (where the rotation of the retroreflector about the optical axis of the retroreflector has no effect on the measurement), the analogous rotation of the roof reflectors causes the reflected line to rotate at twice the angle between the constituent reflectors of the optical roof, thereby providing an advantage of measuring a rotation about the optical line of sight.

(6) The use of an embodiment of a metrology frame and/or a metrology platform to transfer of optical coordinates, defined by the geometric effect of the retroreflector on the reflected light, to mechanical coordinates. Here,
  a. The above-discussed use of a SMR provides an easy solution, using the offline alignment of the optical vertex of the retroreflector to the mechanical center of a ball (spherical shell of the SMR with a known diameter).
  b. If a retroreflector is configured as a cylinder-mounted retroreflector (CMR), with the vertex of the retroreflector mounted on an axis of the mechanical cylinder rather than on the axis of a spherical shell, such CMR, it will provide a similar geometric transfer of optical coordinates of a mechanical cylinder with known diameter and known position from a datum/fiducial plane perpendicular to the cylinder axis.

(7) The use of an embodiment in which at least one retroreflector is machined into or mounted onto another component of the optical system, which component in turn is used for establishing the set of mechanical coordinates.

(8) The use of an embodiment in which a wavefront sensor is configured not as a phase shifting interferometer but as a different form of an interferometer system, for
  i. Visual or image analysis based on the appearance of patterns of interferometric fringes in an optical image formed with the use of light returned from an optical component affixed to the metrology frame;
  ii. Determination of phase variations based at least in part on temporal or spatial modulation of the relative phase of the two interfering wavefronts. Measurements using temporal phase variations use a plurality of images captured as the wavefront phase is varied with some device, such as PZT actuators. As an alternate, a single image can be used with controlled wavefront phase varied across the interferogram, such as implementing a constant phase gradient by introducing a relative tilt between the two interfering wavefronts. In both cases, the desired measurement is obtained by computer processing of the image data.
  iii. Determination of phase variations based on spatial or temporal modulation of polarization, which affects the interference is some way that allows the phase variations to be calculated from the images. An example of this uses a rotating polarizing element in the combined beam of an interferometer whereintofor the two polarization states of the interfering beams are circular with opposite handedness. Alternately, a set of polarizing elements can be spatially arranged to provide a similar result from a fixed image.
  iv. Determination of phase variations based on spatial or temporal modulation of the frequency, or wavelength of the light, coupled with sensors and software to determine the phase. The frequency modulation, coupled with propagation differences between the two wavefronts in the interferometer causes a change in the resulting images that can be processed with a computer to determine the phase variations.

(9) The use of an embodiment that utilizes a wavefront sensor configured to measure variations in the wavefront gradient, or slope:
  i. any form of Hartmann sensor, including Shack-Hartmann or Korhonen-Hartmann sensor
  ii. any form of deflectometry method including Phase Measuring Deflectometry, SCOTS (Software Configurable Optical Test System from University of Arizona), or FORM (Flexible Optical Ray Metrology from AOS)
  iii. a shearing wavefront sensor, (which includes substantially any forms of lateral shearing interferometric wavefront sensor and radial shearing wavefront sensor)

(10) The use of an embodiment that generally utilizes a physical optics-based wavefront sensing approach, such as
  i. Any form of phase diversity wavefront sensor methodology, including use of extrafocal images and curvature sensing
  ii. Codona's dOTF wavefront sensing that utilizes amplitude or phase modulation and Fourier-analysis-based processing of acquired data

(10) The use of an embodiment of the invention with any of a number of dedicated optical instruments such as, for example, alignment telescope; theodolite; autocollimator; point source microscope.

(11) Furthermore, in addition to use for aligning a component for optical measurements, an embodiment of the invention may include at least one of the following uses:
  a. Use as a master to guide alignment of multiple optical elements and sensors in an optical system;
  b. Use to guide a component or assembly that requires precise position control of any number of degrees of freedom;
  c. Use with multiple retroreflectors to measure shape or change of shape of any object
  d. Combined with an optical system with geometry that can be varied in a controllable way to enable large dynamic range for the measurements. A laser tracker is an example of such a system.
  e. Use for measuring position of substantially any object in 3D-space In a specific case, when it is the cylindrical converging wavefront that is being used, and when such wavefront is created with a hologram, the embodiment of the invention can be used in combination with any number of optical elements disposed between the hologram and the retroreflector. Such arrangement may be particularly advantageous for aligning an optical system where light can be reflected from curved mirrors or transmitted by lenses such that the light has the appropriate cylindrical wavefront shape at the retroreflector. The fact that the light wavefront is not cylindrical at the CGH itself does not degrade the ability of the embodiment to measure the position of the retroreflector with respect to the position of the line focus.

Accordingly, the invention should not be viewed as being limited to the disclosed embodiment(s).

LIST OF REFERENCE NUMERALS 100 wavefront sensor (shown implemented as commercial phase-shifting interferometer system)
110 interferometer
114 Fizeau sphere
118 optical wavefront
120 focus
124 expanding optical wavefront
128 holographic component or system
132 optical wavefront/beam of light
136 optical component/workpiece under test
136A surface of optical workpiece under test
140 arrow showing propagation of light
150 sphere-mounted retroreflector
160 corner-cube retroreflector element
170 housing spherical shell
174 outer surface of the housing spherical shell
200 optical measurement system
210 wavefront sensor
210A microprocessor/computer/programmed electronic circuitry
228 optical system generally containing a hologram
230 optical wavefront/beam of light
250 metrology frame
250A arrows indicating degrees of freedom/repositioning of metrology frame
254 optical workpiece
260 retroreflector structure
260A retroreflector element of the retroreflector structure 262 beam of light/optical wavefront
266 axis/reference axis/optical axis
274 retroreflector structure
274A retroreflector, retroreflector element
278 edge/corner/reference point of optical workpiece
282 location of contact between retroreflector structure and metrology frame
300 metrology platform
302 metrology frame
304 optical system, generally containing a hologram
308 carriage
312 housing base
316 retroreflector holder
320 fiducial structures/datum features
322 screen/planar optical reflector
324 optical workpiece
328 optical retroreflector structure
336 collar holder
336A foot of collar holder
336B shoulder plate(s)
336C outer surface of the shoulder plate(s)
340 support base
344 bearing
350 substrate holder
354 substrate containing hologram/hologram system
a, b, c, d, e, f, g holographic regions/patches
356 bearing
358 converging beams of light with non-spherical/cylindrical wavefronts
408, 408A, 408B holographic regions or patches
410, 410A, 410B line foci
412A, 412B converging beams of light with non-spherical/cylindrical optical wavefronts
510 line focus

What is claimed is:

1. A metrology platform comprising:
a metrology frame having a reference axis and comprising:
   a carriage structured to include:
      a housing base that contains a set of fiducial structures and that is dimensioned to receive and removably hold thereat an optical workpiece such that at least one of a first spatial position and a first spatial orientation of a first reference point of the optical workpiece is in a first pre-defined dimensional relationship with respect to the set of fiducial structures; and
      at least one retroreflector holder affixed to the housing base and configured to receive and removably hold thereat at least one optical retroreflector structure such that at least one of a second spatial position and a second spatial orientation of a second reference point of the at last one optical retroreflector structure is in a second pre-defined dimensional relationship with respect to the set of fiducial structures,
      wherein the at least one optical retroreflector structure comprises at least one optical retroreflector;
and
   a hologram carried by or in an optically-transparent substrate and having at least one primary holographic region defined to form, in transmission therethrough, at least one corresponding spatially-converging optical wavefront when irradiated with an input beam of light,
wherein the metrology frame and the hologram are spatially aligned such that light corresponding to the at least one spatially converging optical wavefront formed by the at least one primary holographic region enters an aperture of the at least one optical retroreflector.

2. A metrology platform according to claim 1, wherein:
(11a) the metrology platform further comprises a substrate holder having a substrate holder frame, to which the optically-transparent substrate is affixed, and equipped with at least one substrate holder bearing enabling linear and/or angular translation of the substrate holder frame with the optically-transparent substrate within the substrate holder;
and/or
(11b) said at least one primary holographic region is defined to form the at least one corresponding spatially-converging optical wavefront that is non-spherical;
and/or
(11c) said at least one primary holographic region is defined to form the at least one corresponding spatially-converging wavefront that is cylindrical;
and/or
(11d) said at least one primary holographic region is defined to form the at least one corresponding spatially-converging cylindrical wavefront possessing tilt non-uniformly distributed across said wavefront;
and/or
(11e) said at least one primary holographic region is defined to form the at least one corresponding spatially-converging optical wavefront characterized by a first line focus aligned with a first axis;
and/or
(11f) said at least one primary holographic region is defined to form the at least one corresponding spatially-converging optical wavefront characterized by a second line focus aligned with a first second axis, the second axis being substantially transverse to the first axis.

3. A metrology platform according to claim 2,
wherein the at least one optical retroreflector structure of the metrology frame necessarily includes at least two optical retroreflector structures,
wherein the at least one retroreflector holder is configured to removably accommodate first and second of said at least two optical retroreflector structures at the carriage at different first and second azimuthal angles as viewed from a point of intersection between the reference axis and a plane of the carriage, and
wherein the at least one primary holographic region includes:
   at least two primary holographic regions configured to form, when irradiated with the input beam of light, at least two respectively-corresponding optical wavefronts each of which converges towards a corresponding line focus and is directed, in operation of the metrology platform, towards a respective one of said at least two optical retroreflector structures that are located at the carriage at different first and second azimuthal angles.

4. An optical measurement system comprising:
a wavefront sensor configured to generate the input beam of light having an input axis and the metrology platform according to claim 2 that is disposed to intersect the light from the input beam of light,
wherein said metrology frame is spatially separated from the wavefront sensor by said hologram.

5. A method for processing an optical component in an optical measurement system, the method comprising:

with the use of the optical measurement system according to claim 4:
irradiating the at least one optical retroreflector with the at least one spatially-converging optical wavefront;
forming an initial image based at least in part on acquisition of light from said at least one spatially-converging optical wavefront that has been reflected by the at least one optical retroreflector back to the wavefront sensor; and
assessing at least one of spatial tilt, azimuthal angular deviation, transverse shift, and longitudinal shift of the at least one of optical retroreflector with respect to said spatially-converging optical wavefront based on said initial image.

6. A method according to claim 5, further comprising:
spatially re-aligning the at least one optical retroreflector to transform said initial image to a resulting image that is substantially devoid of image features representing the at least one of spatial tilt, azimuthal angular deviation, transverse shift, and longitudinal shift, thereby eliminating said at least one of spatial tilt, azimuthal angular deviation, transverse shift, and longitudinal shift.

7. A method according to claim 6, wherein:
the wavefront sensor includes an optical interferometer;
the initial image and the resulting image include corresponding interferograms; and
the image features are interferometric fringes.

8. A method according to claim 6, further comprising:
affixing the optical workpiece to the metrology frame of the optical measurement system in the first pre-defined relationship with respect to the set of fiducial structures carried by the housing base,
wherein said spatially re-aligning the at least one optical retroreflector includes spatially re-aligning the at least one optical retroreflector without changing mutual positioning and mutual orientation between the at least one optical retroreflector and the optical workpiece.

9. A method according claim 8, further comprising:
assessing a spatial profile and/or a shape of the optical workpiece from a target interferometric optical image formed with the use of a portion of said input beam of light that has been transformed by the hologram and reflected by the optical workpiece.

10. A method according to claim 5, wherein said irradiating includes overlapping a line focus of the at least one spatially-converging optical wavefront with the at least one retroreflector and/or irradiating the at least one retroreflector with a spatially-converging cylindrical wavefront possessing tilt non-uniformly distributed across said wavefront.

11. A method according to claim 5, further comprising:
prior to said irradiating:
forming an auxiliary initial image based at least in part on acquisition of light from a reflected alignment optical wavefront that has been formed by a secondary alignment holographic region of the hologram irradiated with the input beam of light; and
repositioning the hologram with respect to the input axis of the input beam of light to substantially eliminate from said auxiliary initial image any image features representing at least one of spatial tilt, azimuthal angular deviation, transverse shift, and longitudinal shift of the hologram with respect to the input beam of light.

12. A method according to claim 5,
wherein said irradiating the at least one optical retroreflector includes irradiating the at least one optical retroreflector with more than one spatially converging optical wavefronts produced by the hologram.

13. A method according to claim 5, further comprising:
eliminating said at least one of spatial tilt, azimuthal angular deviation, transverse shift, and longitudinal shift by:
(24a) substantially co-locating a reference point of the at least one optical retroreflector with the first line focus and/or the second line focus when the at least one primary holographic region is defined to form the at least one corresponding spatially-converging optical wavefront characterized by such first line focus aligned with the first axis and/or by a second line focus aligned with the second axis that is substantially transverse to the first axis; and/or
(24b) producing a first initial image formed based at least in part on acquisition of light from the input beam of light that has been reflected by a first optical retroreflector of the at least one optical retroreflector, and producing a second initial image formed based at least in part on acquisition of light from the input beam of light that has been reflected by a second optical retroreflector from the at least one optical retroreflector, wherein the first and second optical retroreflectors are positioned at two different azimuthal locations as viewed from the point of intersection of the reference axis with the plane of the carriage.

14. A method according to claim 5, wherein:
(26a) the at least one optical retroreflector includes a corner-cube retroreflector, and
(26b) said assessing at least one of spatial tilt, azimuthal angular deviation, transverse shift, and longitudinal shift includes substantially co-locating a reference point of the at least one optical retroreflector with the first line focus and/or the second line focus when the at least one primary holographic region is defined to form the at least one corresponding spatially-converging optical wavefront characterized by such first line focus aligned with the first axis and/or by a second line focus aligned with the second axis that is substantially transverse to the first axis,
and
wherein the substantially co-locating includes co-locating an apex of the at least one corner-cube retroreflector with the first line focus and/or the second line focus.

15. A metrology platform according to claim 1, wherein the hologram further includes a secondary alignment holographic region defined to form, in reflection therefrom, a reflected alignment optical wavefront when irradiated with the input beam of light.

16. An optical measurement system comprising:
a wavefront sensor configured to generate the input beam of light having an input axis and the metrology platform according to claim 1 that is disposed to intersect the light from the input beam of light,
wherein said metrology frame is spatially separated from the wavefront sensor by said hologram.

17. A metrology platform comprising:
a metrology frame having a reference axis and comprising:
a carriage structured to include:
a housing base that contains a set of fiducial structures and that is dimensioned to receive and removably hold thereat an optical workpiece such that at least one of a first spatial position and a first spatial orientation of a first reference point of the optical workpiece is in a first pre-defined dimensional relationship with respect to the set of fiducial structures; and at least one retroreflector holder affixed to the housing base and configured to receive and removably hold thereat at least one optical retroreflector structure such that at least one of a second spatial position and a second spatial orientation of a second reference point of the at last one optical retroreflector structure is in a second pre-defined dimensional relationship with respect to the set of fiducial structures, wherein the at least one optical retroreflector structure comprises at least one optical retroreflector;

and a hologram carried by or in an optically-transparent substrate and having:

at least one primary holographic region defined to form, in transmission therethrough, at least one corresponding spatially-converging optical wavefront when irradiated with an input beam of light, and (ii) a secondary alignment holographic region defined to form, in reflection therefrom, a reflected alignment optical wavefront when irradiated with the input beam of light.

18. A metrology platform according to claim 17, wherein:
(35a) the metrology platform further comprises a substrate holder having a substrate holder frame, to which the optically-transparent substrate is affixed, and equipped with at least one substrate holder bearing enabling linear and/or angular translation of the substrate holder frame with the optically-transparent substrate within the substrate holder;
and/or
(35b) said at least one primary holographic region is defined to form the at least one corresponding spatially-converging optical wavefront that is non-spherical;
and/or
(35c) said at least one primary holographic region is defined to form the at least one corresponding spatially-converging wavefront that is cylindrical;
and/or
(35d) said at least one primary holographic region is defined to form the at least one corresponding spatially-converging cylindrical wavefront possessing tilt non-uniformly distributed across said wavefront;
and/or
(35e) said at least one primary holographic region is defined to form the at least one corresponding spatially-converging optical wavefront characterized by a first line focus aligned with a first axis;
and/or
(35f) said at least one primary holographic region is defined to form the at least one corresponding spatially-converging optical wavefront characterized by a second line focus aligned with a first axis, the second axis being substantially transverse to the first axis.

19. A metrology platform according to claim 18,
wherein the at least one optical retroreflector structures of the metrology frame necessarily includes at least two optical retroreflector structures,
wherein the at least one retroreflector holder is configured to removably accommodate first and second of said at least two optical retroreflector structures at the carriage at different first and second azimuthal angles as viewed from a point of intersection between the reference axis and a plane of the carriage, and
wherein the at least one primary holographic region includes:
at least two primary holographic regions configured to form, when irradiated with the input beam of light, at least two respectively-corresponding optical wavefronts each of which converges towards a corresponding line focus and is directed, in operation of the metrology platform, towards a respective one of said at least two optical retroreflector structures that are located at the carriage at different first and second azimuthal angles.

20. An optical measurement system comprising:
a wavefront sensor configured to generate the input beam of light having an input axis and the metrology platform according to claim 17 that is disposed to intersect the light from the input beam of light,
wherein said metrology frame is spatially separated from the wavefront sensor by said hologram.

21. A method for processing an optical component in an optical measurement system, the method comprising:
with the use of the optical measurement system according to claim 20:
irradiating the at least one optical retroreflector with the at least one spatially-converging optical wavefront;
forming an initial image based at least in part on acquisition of light from said at least one spatially-converging optical wavefront that has been reflected by the at least one optical retroreflector back to the wavefront sensor; and
assessing at least one of spatial tilt, azimuthal angular deviation, transverse shift, and longitudinal shift of the at least one of optical retroreflector with respect to said spatially-converging optical wavefront based on said initial image.

22. A method according to claim 21, further comprising:
spatially re-aligning the at least one optical retroreflector to transform said initial image to a resulting image that is substantially devoid of image features representing the at least one of spatial tilt, azimuthal angular deviation, transverse shift, and longitudinal shift, thereby eliminating said at least one of spatial tilt, azimuthal angular deviation, transverse shift, and longitudinal shift.

23. A method according to claim 22, wherein:
the wavefront sensor includes an optical interferometer;
the initial image and the resulting image include corresponding interferograms; and
the image features are interferometric fringes.

24. A method according to claim 22, further comprising:
affixing the optical component to the metrology frame of the optical measurement system in the first pre-defined relationship with respect to the set of fiducial structures carried by the housing base,
wherein said spatially re-aligning the at least one optical retroreflector includes spatially re-aligning the at least one optical retroreflector without changing mutual positioning and mutual orientation between the at least one optical retroreflector and the optical component.

25. A method according claim 24, further comprising:
assessing a spatial profile and/or a shape of the optical component from a target interferometric optical image formed with the use of a portion of said input beam of light that has been transformed by the hologram and reflected by the optical component.

26. A method according to claim 21, wherein said irradiating includes overlapping a line focus of the at least one spatially-converging optical wavefront with the at least one retroreflector and/or irradiating the at least one retroreflector with a spatially-converging cylindrical wavefront possessing tilt non-uniformly distributed across said wavefront.

27. A method according to claim 21, further comprising: prior to said irradiating:
forming an auxiliary initial image based at least in part on acquisition of light from a reflected alignment optical wavefront that has been formed by a secondary alignment holographic region of the hologram irradiated with the input beam of light; and
repositioning the hologram with respect to the input axis of the input beam of light to substantially eliminate from said auxiliary initial image any image features representing at least one of spatial tilt, azimuthal angular deviation, transverse shift, and longitudinal shift of the hologram with respect to the input beam of light.

28. A method according to claim 21,
wherein said irradiating the at least one optical retroreflector includes irradiating the at least one optical retroreflector with more than one spatially converging optical wavefronts produced by the hologram.

29. A method according to claim 21, further comprising:
eliminating said at least one of spatial tilt, azimuthal angular deviation, transverse shift, and longitudinal shift by:
(44a) substantially co-locating a reference point of the at least one optical retroreflector with the first line focus and/or the second line focus when the at least one primary holographic region is defined to form the at least one corresponding spatially-converging optical wavefront characterized by such first line focus aligned with the first axis and/or by a second line focus aligned with the second axis that is substantially transverse to the first axis; and/or
(44b) producing a first initial image formed based at least in part on acquisition of light from the input beam of light that has been reflected by a first optical retroreflector of the at least one optical retroreflector, and producing a second initial image formed based at least in part on acquisition of light from the input beam of light that has been reflected by a second optical retroreflector from the at least one optical retroreflector, wherein the first and second optical retroreflectors are positioned at two different azimuthal locations as viewed from the point of intersection of the reference axis with the plane of the carriage.

30. A method according to claim 21, wherein:
(45a) the at least one optical retroreflector includes a corner-cube retroreflector, and
(45b) said assessing at least one of spatial tilt, azimuthal angular deviation, transverse shift, and longitudinal shift includes substantially co-locating a reference point of the at least one optical retroreflector with the first line focus and/or the second line focus when the at least one primary holographic region is defined to form the at least one corresponding spatially-converging optical wavefront characterized by such first line focus aligned with the first axis and/or by a second line focus aligned with the second axis that is substantially transverse to the first axis, and
wherein the substantially co-locating includes co-locating an apex of the at least one corner-cube retroreflector with the first line focus and/or the second line focus.

* * * * *